(12) United States Patent
Yang et al.

(10) Patent No.: US 10,813,090 B2
(45) Date of Patent: Oct. 20, 2020

(54) RESOURCE CONFIGURATION METHOD AND DEVICE

(71) Applicant: ZTE CORPORATION, Shenzhen, Guangdong (CN)

(72) Inventors: Jin Yang, Guangdong (CN); Shuanghong Huang, Guangdong (CN); Youxiong Lu, Guangdong (CN); Haigang He, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 77 days.

(21) Appl. No.: 16/129,633

(22) Filed: Sep. 12, 2018

(65) Prior Publication Data

US 2019/0014577 A1 Jan. 10, 2019

Related U.S. Application Data

(63) Continuation of application No. 16/075,556, filed as application No. PCT/CN2016/091771 on Jul. 26, 2016, now abandoned.

(30) Foreign Application Priority Data

Feb. 3, 2016 (CN) .......................... 2016 1 0075749

(51) Int. Cl.
*H04W 72/04* (2009.01)
*H04W 4/46* (2018.01)
(Continued)

(52) U.S. Cl.
CPC ....... *H04W 72/0446* (2013.01); *H04L 5/0007* (2013.01); *H04L 5/0053* (2013.01);
(Continued)

(58) Field of Classification Search
CPC ............... H04W 72/0446; H04W 4/46; H04W 72/0413; H04W 80/08; H04L 5/0007; H04L 5/0053
See application file for complete search history.

(56) References Cited

U.S. PATENT DOCUMENTS

2010/0118991 A1 5/2010 Lee et al.
2011/0039568 A1* 2/2011 Zhang ................... H04W 52/50
455/452.1
(Continued)

FOREIGN PATENT DOCUMENTS

CN 104469961 A 3/2015
CN 104704888 A 6/2015
(Continued)

OTHER PUBLICATIONS

International Search Report for PCT/CN2016/091771, dated Nov. 9, 2016 in 4 pages.
(Continued)

*Primary Examiner* — Christine Ng
(74) *Attorney, Agent, or Firm* — Knobbe, Martens, Olson & Bear, LLP

(57) ABSTRACT

Provided are a resource configuration method and device. The method includes: assigning frequency-domain resource blocks (RBs) in a system to one or more sub-channels to form a sub-channel configuration in the system, where each of the RBs is included in only one sub-channel; and determining a unique sub-channel index for each sub-channel, and instructing one or more sub-channels, through the sub-channel index, the RBs included in the instructed one or more sub-channels to carry control information and/or data information of a user equipment. The solution solves the problem of large overheads incurred by indicating configured time-domain/frequency-domain resources in a V2V
(Continued)

Assign frequency-domain resource blocks (RBs) of a system into one or more sub-channels to form a sub-channel configuration of the system, where each RB is included in only one sub-frame — S202

Determine a unique sub-channel index for each sub-channel, and instruct one or more sub-channels, through the sub-channel index, to use the RBs included in the instructed one or more sub-channels to carry control information and/or data information of a user equipment — S204 communication system and reduces overheads incurred by indicating configured time-domain/frequency-domain resources.

19 Claims, 14 Drawing Sheets

(51) Int. Cl.
*H04L 5/00* (2006.01)
*H04W 80/08* (2009.01)
*H04W 4/06* (2009.01)

(52) U.S. Cl.
CPC ......... *H04W 4/46* (2018.02); *H04W 72/0413* (2013.01); *H04W 80/08* (2013.01); *H04W 4/06* (2013.01)

(56) References Cited

U.S. PATENT DOCUMENTS

| | | | |
|---|---|---|---|
| 2011/0058512 A1* | 3/2011 | Koo | H04L 5/0037 370/312 |
| 2012/0224546 A1* | 9/2012 | Chang | H04W 76/14 370/329 |
| 2014/0328329 A1 | 11/2014 | Novlan et al. | |
| 2015/0009875 A1 | 1/2015 | Khoryaev et al. | |
| 2015/0009903 A1 | 1/2015 | Xue et al. | |
| 2015/0009948 A1 | 1/2015 | Raaf et al. | |
| 2015/0009949 A1 | 1/2015 | Khoryaev et al. | |
| 2015/0009964 A1 | 1/2015 | Ellenbeck et al. | |
| 2015/0009975 A1 | 1/2015 | Gupta | |
| 2015/0085723 A1* | 3/2015 | Chen | H04L 5/0094 370/280 |
| 2015/0085765 A1* | 3/2015 | Tavildar | H04L 5/0094 370/329 |
| 2015/0358946 A1 | 12/2015 | Wang et al. | |
| 2016/0226600 A1 | 8/2016 | Ellenbeck et al. | |
| 2016/0286508 A1 | 9/2016 | Khoryaev et al. | |
| 2018/0249499 A1* | 8/2018 | Kim | H04W 74/0808 |

FOREIGN PATENT DOCUMENTS

| | | |
|---|---|---|
| CN | 104812052 A | 7/2015 |
| JP | 2011-504322 A | 2/2011 |
| WO | WO 2015006082 A1 | 1/2015 |
| WO | 2015/182949 A1 | 3/2015 |

OTHER PUBLICATIONS

Written Opinion of the International Searching Authority for PCT/CN2016/091771, dated Sep. 11, 2016 in 5 pages.
Office Action in corresponding Japanese Patent Application No. 2018-540814 dated Aug. 13, 2019, 4 pages.
ZTE, Resource pool allocation enhancement for V2V, 3GPP TSG-RAN WGI Meeting #83, R1-156658, Nov. 15-22, 2015, 7 pages.
Panasonic, Discussion on resource allocation mechanism in V2X, 3GPP TSG RAN WG1 Meeting #83, R1-156963, Nov. 15-22, 2015, 4 pages.
LG Electronics, Discussion on resource pool structure and control signaling for PC5-based V2V, 3GPP TSG RAN WG1 Meeting #83, R1-156892, Nov. 15-22, 2015, 6 pages.
CATT, Physical layer channel design enhancement to support resource allocation in PC5-based V2V, 3GPP TSG RAN WG1 Meeting #83, R1-156607, Nov. 15-22, 2015, 5 pages.
Nokia, DL L1/L2 control signaling channel encoding structures, 3GPP TSG-RAN WG1 meeting #46 bis, R1-062837 Oct. 9-13, 2006, 6 pages.

* cited by examiner

SCI information (a) Physical RB resource (b) Logical RB resource (a)

(b)

(c)

RESOURCE CONFIGURATION METHOD AND DEVICE

CROSS REFERENCE TO RELATED APPLICATIONS

This application is a continuation application of U.S. application Ser. No. 16/075,556, filed on Aug. 3, 2018, which is a National Stage Application, filed under 35 U.S.C. 371, of International Application No. PCT/CN2016/091771 with an international filing date of Jul. 26, 2016, which is based upon and claims priority to Chinese Patent Application No. CN201610075749.1, filed on Feb. 3, 2016, the entire contents of all of which are incorporated herein by reference.

TECHNICAL FIELD

Embodiments of the present disclosure relate to, but are not limited to, communication field and, in particular, relate to a resource configuration method and device.

BACKGROUND

With the rapid development of economy and society, the rapid growth of automobile ownership and the frequent occurrence of road traffic accidents in China have become one of the important factors affecting the public safety in China in recent years. Technologies for improving vehicle safety are mainly divided into passive safety technologies and active safety technologies. Passive safety technologies are used to protect people and articles inside and outside a vehicle when an accident has occurred. Active safety technologies are used to prevent and reduce vehicle accidents and to prevent people from being harmed. Active safety technologies are the key and trend in the development of modern vehicle safety technologies.

An internet of vehicles (IOY) refers to a system that provides vehicle information through sensors, vehicle-mounted terminals and electronic tags mounted on vehicles, implements Vehicle-to-Vehicle (V2V), Vehicle-to-Pedestrian (V2P) and Vehicle-to-Infrastructure (V2I) intercommunication by using various communication technologies, effectively uses information by way of extraction, sharing, etc. on an information network platform, and effectively controls vehicles and provides comprehensive services for vehicles. The internet of vehicles may implement communication-based vehicle information notification and collision hazard warning. By using advanced wireless communication technologies and a new generation of information processing technologies, the internet of vehicles may implement real-time information exchange between vehicles and between vehicles and roadside infrastructure, inform each other of the current status (including position, speed, accelerated speed and driving path of the vehicle) and the known road environment information, cooperatively acquire road hazard conditions and provide various collision warning information in time to prevent road traffic safety accidents. The internet of vehicles has become a new way to solve road traffic safety problems.

In recent years, with the development of new mobile communication technologies, it has become a research hotspot to implement IOV communications on the basis of the Long Time Evolution (LTE) technology. In the Device-to-Device (D2D) communication manner of the LTE system, when a service needs to be transmitted between User Equipments (UEs), service data between the UEs is not forwarded by a base station. Rather, the service data is directly transmitted by a source UE to a target UE over an air interface. FIG. 1 is a schematic diagram of a D2D communication structure in the related art. As shown in FIG. 1, this communication manner has features that are significantly different from those of a communication manner of a traditional cellular system. For V2V communication of JOY, the D2D communication manner is applicable to short-distance communication between vehicles, thereby achieving the effects of saving wireless spectrum resources, reducing the data transmission pressure of the core network, reducing system resource occupation, increasing the spectrum efficiency of a cellular communication system, reducing the transmit power consumption of a terminal and saving network operation costs to a large extent.

In a V2V communication system, a broadcast communication method is used, each UE separately transmits a broadcast message to inform its own data, and the message format and the data packet size are relatively fixed. To provide a sufficiently flexible resource indication effect, a traditional resource indication or configuration solution uses large overheads to indicate configured time-domain/frequency-domain resources and thus is not applicable to features of V2V information transmission.

No effective solution has been provided to solve the problem of large overheads incurred by indicating configured time-domain/frequency-domain resources in a V2V communication system in the related art.

SUMMARY

The following is a summary of a subject matter described herein in detail. This summary is not intended to limit the scope of the claims.

Embodiments of the present disclosure provide a resource configuration method and device to solve at least the problem of large overheads incurred by indicating configured time-domain/frequency-domain resources in a V2V communication system in the related art.

In one aspect of embodiments of the present disclosure, a resource configuration method is provided. The method includes:

assigning frequency-domain resource blocks (RBs) of a system to one or more sub-channels into form a sub-channel configuration of the system, where each of the RBs is included in only one sub-channel; and determining a unique sub-channel index for each sub-channel, and instructing one or more sub-channels, through the sub-channel index, to use the RBs included in the instructed one or more sub-channels to carry control information and/or data information of a user equipment.

In an alternative embodiment, each sub-channel includes one or more RBs in frequency domain and one subframe in time domain.

In an alternative embodiment, the sub-channel configuration indicates assignment of the sub-channels on consecutive physical RBs.

Alternatively, the sub-channel configuration is used for indicating consecutive logical RBs of sub-channels assignment, where a mapping rule is built between the consecutive logical RBs and the physical RBs.

In an alternative embodiment, when the one or more sub-channels are used for carrying the control information and the data information, the control information is carried in one of the following manners:

on time-domain resources of the one or more sub-channels, the control information is mapped onto and carried by all available symbols in a subframe, and on frequency-domain resources of the sub-channel, the control information is mapped onto and carried by one or more fixed RBs;

on the time-domain resources of the one or more sub-channels, the control information is mapped onto and carried by one or more fixed symbols in the subframe, and on the frequency-domain resources of the one or more sub-channels, the control information is mapped onto and carried by all RBs included in the sub-channel; and on the time-domain resources of the one or more sub-channels, the control information is mapped onto and carried by one or more fixed symbols in the subframe, and on the frequency-domain resources of the one or more sub-channels, the control information is mapped onto and carried by the one or more fixed RBs.

The symbols are Single-Carrier Frequency-Division Multiple Access (SC-FDMA) symbols or Orthogonal Frequency-Division Multiplexing (OFDM) symbols of the subframe.

In an alternative embodiment, when the one or more sub-channels are used for carrying the control information and the data information or when the one or more sub-channels are used for carrying the data information, the data information is carried in one of the following manners:

on time-domain resources of the one or more sub-channels, the data information is mapped onto and carried by all available symbols in a subframe, and on frequency-domain resources of the sub-channel, the data information is mapped onto and carried by one or more fixed RBs;

on the time-domain resources of the one or more sub-channels, the data information is mapped onto and carried by one or more fixed symbols in the subframe, and on the frequency-domain resources of the one or more sub-channels, the data information is mapped onto and carried by all RBs included in the sub-channel; and on the time-domain resources of the one or more sub-channels, the data information is mapped onto and carried by the one or more fixed symbols in the subframe, and on the frequency-domain resources of the one or more sub-channels, the data information is mapped onto and carried by the one or more fixed RBs.

In an alternative embodiment, when the one or more sub-channels are used for carrying the control information and/or the data information of the user equipment, the sub-channel includes a control information resource domain and a data information resource domain.

The control information resource domain of the one or more sub-channels is used for carrying the control information of the user equipment, and the data information resource domain of the one or more sub-channels is used for carrying the data information of the user equipment.

In an alternative embodiment, resources included in the control information resource domain and the data information resource domain in the one or more sub-channels are as follows:

in resources of the each of the sub-channels, resources excluding resources included in the control information resource domain are resources included in the data information resource domain.

In an alternative embodiment, the control information resource domain in the one or more sub-channels is indicated in one of the following manners:

predefined by the system; indicated by a system broadcast message; and indicated by high-layer signaling.

In an alternative embodiment, when the resource configuration of the control information resource domain in the one or more sub-channels is predefined by the system, resources included in the control information resource domain of the one or more sub-channels are predefined by the system.

In an alternative embodiment, when the resource configuration of the control information resource domain and the resource configuration of the data information resource domain are indicated by a system broadcast message and/or high-layer signaling, resources included in the control information resource domain of the one or more sub-channels are indicated by the system broadcast message and/or the high-layer signaling.

In an alternative embodiment, resources included in the control information resource domain of the one or more sub-channels includes one of the following manners:

on time-domain resources of the one or more sub-channels, the control information resource domain comprises all available symbols in a subframe, and on frequency-domain resources of the sub-channel, the control information resource domain comprises one or more fixed RBs;

on the time-domain resources of the one or more sub-channels, the control information resource domain comprises one or more fixed symbols in the subframe, and on the frequency-domain resources of the one or more sub-channels, the control information resource domain comprises all RBs; and on the time-domain resources of the one or more sub-channels, the control information resource domain comprises the one or more fixed symbols in the subframe, and on the frequency-domain resources of the one or more sub-channels, the control information resource domain comprises the one or more fixed RBs.

In an alternative embodiment, resources included in the data information resource domain in the one or more sub-channels include one of the following manners:

on time-domain resources of the one or more sub-channels, the data information resource domain comprises all available symbols in a subframe, and on frequency-domain resources of the sub-channel, the data information resource domain comprises one or more fixed RB s;

on the time-domain resources of the one or more sub-channels, the data information resource domain comprises one or more fixed symbols in the subframe, and on the frequency-domain resources of the one or more sub-channels, the data information resource domain comprises all RBs; and on the time-domain resources of the one or more sub-channels, the data information resource domain comprises the one or more fixed symbols in the subframe, and on the frequency-domain resources of the one or more sub-channels, the data information resource domain comprises the one or more fixed RBs.

In an alternative embodiment, the sub-channel configuration is indicated using at least one of the following manners:

predefined by the system; indicated by a system broadcast message; and indicated by high-layer signaling.

In an alternative embodiment, when the sub-channel configuration is predefined by the system, a quantity of the RBs and positions of the RBs included in the each of the sub-channels are predefined by the system, sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, a quantity of the RBs and positions of the RBs included in the each of the sub-channels are indicated by the system broadcast message and/or the high-layer signaling, the sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, each of the sub-channels is configured to have a same quantity of RBs, the quantity of the RBs included in one sub-channel is indicated, or a quantity of the sub-channels is indicated, the sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, the sub-channel configuration on m RBs is indicated, where m is a positive integer less than a quantity of the available RBs in the system;

the sub-channel configuration on the m RBs is repeated on the available RBs in the system, the sub-channel configuration of all the available RBs in the system is determined, the sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, a bitmap sequence is used to indicate the sub-channel configuration, where a length the bitmap sequence is equal to a quantity of the available RBs in the system, and bits in the bitmap sequence are in one-to-one correspondence with the available RBs in the system;

in the bitmap sequence, an RB corresponding to a bit indicated by "1" is used as a starting RB of the sub-channel; and an RB corresponding to a bit indicated by "0" belongs to a same sub-channel with a front adjacent RB; and the sub-channel indexes of the sub-channels are sequentially defined, and RBs included in a sub-channel corresponding to each of the sub-channel indexes are uniquely determined.

Alternatively, in the bitmap sequence, the RB corresponding to the bit indicated by "0" is used as the starting RB of the sub-channel; and the RB corresponding to the bit indicated by "1" belongs to the same sub-channel with a front adjacent RB, and the sub-channel indexes of the sub-channels are sequentially defined, and RBs included in a sub-channel corresponding to each of the sub-channel indexes are uniquely determined.

In an alternative embodiment, when the sub-channel configuration is indicated by the system broadcast message and/or the high-layer signaling, on available RBs in the system, a position of a starting RB of each of the sub-channels is indicated, where the starting RB of each of the sub-channels is indicated by an actual physical RB index or a logical RB index, and all available RBs whose indexes are after the index of the starting RB of each of the sub-channels and before an index of a starting RB of a next one of the sub-channels are included in the sub-channel;

the sub-channel indexes of the sub-channels are sequentially defined, and RBs included in a sub-channel corresponding to each of the sub-channel indexes are uniquely determined.

In an alternative embodiment, when the sub-channel configuration is indicated by the system broadcast message and/or the high-layer signaling, sub-channels comprising a same quantity of RBs are classified into a same type, a quantity of RBs included in each type of the sub-channels and a quantity of the types of the sub-channels are indicated, and each type of the sub-channels is corresponded to available RBs in the system according to an indicated sequence to determine the sub-channel configuration of the system.

The sub-channel indexes of the sub-channels are sequentially defined, and RBs included in a sub-channel corresponding to each of the sub-channel indexes are uniquely determined.

In an alternative embodiment, when the quantity of the RBs included in each type of sub-channels and the quantity of the types of the sub-channels are indicated so as to determine the sub-channel configuration of the system, an incremental indication method is used for indicating the quantity of RBs included in each type of the sub-channels by indicating a value by which the quantity of RBs included in a current type of the sub-channels is increased from the quantity of RBs included in a previous type of the sub-channels, so that the quantity of RBs included in each sub-channel in the current type is determined.

In an alternative embodiment, multiple sets of sub-channel configurations are indicated at a same time in the system for different resource pools and/or subframes.

In another aspect of embodiments of the present disclosure, a resource configuration device is provided. The device includes: a configuration module and an instruction module.

The configuration module is configured to allocate frequency-domain resource blocks (RBs) of a system into one or more sub-channels to form a sub-channel configuration of the system, where each of the RBs is included in only one sub-channel.

The instruction module is configured to determine a unique sub-channel index for each sub-channel, and instruct one or more sub-channels, through the sub-channel index, to use the RBs included in the instructed one or more sub-channels to carry control information and/or data information of a user equipment.

In an alternative embodiment, each sub-channel includes one or more RBs in frequency domain and one subframe in time domain.

In an alternative embodiment, the sub-channel configuration is used for indicating assignment of the sub-channels on consecutive physical RBs.

Alternatively, the sub-channel configuration is used for indicating consecutive logical RBs of sub-channels assignment, where a mapping rule is built between the consecutive logical RBs and the physical RBs.

In an alternative embodiment, when the one or more sub-channels are used for carrying the control information and the data information, the control information is carried in one of the following manners:

on time-domain resources of the one or more sub-channels, the control information is mapped onto and carried by all available symbols in a subframe, and on frequency-domain resources of the sub-channel, the control information is mapped onto and carried by one or more fixed RBs;

on the time-domain resources of the one or more sub-channels, the control information is mapped onto and carried by one or more fixed symbols in the subframe, and on the frequency-domain resources of the one or more sub-channels, the control information is mapped onto and carried by all RBs included in the sub-channel; and on the time-domain resources of the one or more sub-channels, the control information is mapped onto and carried by one or more fixed symbols in the subframe, and on the frequency-domain resources of the one or more sub-channels, the control information is mapped onto and carried by the one or more fixed RBs.

The symbols are Single-Carrier Frequency-Division Multiple Access (SC-FDMA) symbols or Orthogonal Frequency-Division Multiplexing (OFDM) symbols of the subframe.

In an alternative embodiment, when the one or more sub-channels are used for carrying the control information and the data information or when the one or more sub-channels are used for carrying the data information, the data information is carried in one of the following manners:

on time-domain resources of the one or more sub-channels, the data information is mapped onto and carried by all available symbols in a subframe, and on frequency-domain resources of the sub-channel, the data information is mapped onto and carried by one or more fixed RBs;

on the time-domain resources of the one or more sub-channels, the data information is mapped onto and carried by one or more fixed symbols in the subframe, and on the frequency-domain resources of the one or more sub-channels, the data information is mapped onto and carried by all RBs included in the sub-channel; and on the time-domain resources of the one or more sub-channels, the data information is mapped onto and carried by the one or more fixed symbols in the subframe, and on the frequency-domain resources of the one or more sub-channels, the data information is mapped onto and carried by the one or more fixed RBs.

In an alternative embodiment, when the one or more sub-channels are used for carrying the control information and/or the data information of the user equipment, the sub-channel includes a control information resource domain and a data information resource domain.

The control information resource domain of the one or more sub-channels is used for carrying the control information of the user equipment, and the data information resource domain of the one or more sub-channels is used for carrying the data information of the user equipment.

In an alternative embodiment, resources included in the control information resource domain and the data information resource domain in the one or more sub-channels are:

in resources of the each of the sub-channels, resources excluding resources included in the control information resource domain are resources included in the data information resource domain.

In an alternative embodiment, the control information resource domain in the one or more sub-channels is indicated in one of the following manners:

predefined by the system; indicated by a system broadcast message; and indicated by high-layer signaling.

In an alternative embodiment, when the resource configuration of the control information resource domain in the one or more sub-channels is predefined by the system, resources included in the control information resource domain of the one or more sub-channels are predefined by the system.

In an alternative embodiment, when the resource configuration of the control information resource domain and the resource configuration of the data information resource domain are indicated by a system broadcast message and/or high-layer signaling, resources included in the control information resource domain of the one or more sub-channels are indicated by the system broadcast message and/or the high-layer signaling.

In an alternative embodiment, resources included in the control information resource domain of the one or more sub-channels include one of the following manners:

on time-domain resources of the one or more sub-channels, the control information resource domain comprises all available symbols in a subframe, and on frequency-domain resources of the sub-channel, the control information resource domain comprises one or more fixed RBs;

on the time-domain resources of the one or more sub-channels, the control information resource domain comprises one or more fixed symbols in the subframe, and on the frequency-domain resources of the one or more sub-channels, the control information resource domain comprises all RBs; and on the time-domain resources of the one or more sub-channels, the control information resource domain comprises the one or more fixed symbols in the subframe, and on the frequency-domain resources of the one or more sub-channels, the control information resource domain comprises the one or more fixed RBs.

In an alternative embodiment, resources included in the data information resource domain in the one or more sub-channels include one of the following manners:

on time-domain resources of the one or more sub-channels, the data information resource domain comprises all available symbols in a subframe, and on frequency-domain resources of the sub-channel, the data information resource domain comprises one or more fixed RB s;

on the time-domain resources of the one or more sub-channels, the data information resource domain comprises one or more fixed symbols in the subframe, and on the frequency-domain resources of the one or more sub-channels, the data information resource domain comprises all RBs; and on the time-domain resources of the one or more sub-channels, the data information resource domain comprises the one or more fixed symbols in the subframe, and on the frequency-domain resources of the one or more sub-channels, the data information resource domain comprises the one or more fixed RBs.

In an alternative embodiment, the sub-channel configuration is indicated using at least one of the following manners:

predefined by the system; indicated by a system broadcast message; and indicated by high-layer signaling.

In an alternative embodiment, when the sub-channel configuration is predefined by the system, a quantity of the RBs and positions of the RBs included in the each of the sub-channels are predefined by the system, sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, a quantity of the RBs and positions of the RBs included in the each of the sub-channels are indicated by the system broadcast message and/or the high-layer signaling, the sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, each of the sub-channels is configured to have a same quantity of RBs, the quantity of the RBs included in one sub-channel is indicated, or a quantity of the sub-channels is indicated, the sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, the sub-channel configuration on m RBs is indicated, where m is a positive integer less than a quantity of the available RBs in the system;

the sub-channel configuration on the m RBs is repeated on the available RBs in the system, the sub-channel configuration of all the available RBs in the system is determined, the sub-channel indexes of the sub-channels are sequentially defined, and the RBs included in a sub-channel corresponding to each of the sub-channel indexes are uniquely determined.

In an alternative embodiment, when the sub-channel configuration is indicated by the system broadcast message and/or the high-layer signaling, on available RBs in the system, a bitmap sequence is used to indicate the sub-channel configuration, where a length the bitmap sequence is equal to a quantity of the available RBs in the system, and bits in the bitmap sequence are in one-to-one correspondence with the available RBs in the system;

in the bitmap sequence, an RB corresponding to a bit indicated by "1" is used as a starting RB of the sub-channel; and an RB corresponding to a bit indicated by "0" belongs to a same sub-channel with a front adjacent RB, and the sub-channel indexes of the sub-channels are sequentially defined, and RBs included in a sub-channel corresponding to each of the sub-channel indexes are uniquely determined.

Alternatively, in the bitmap sequence, the RB corresponding to the bit indicated by "0" is used as the starting RB of the sub-channel; and the RB corresponding to the bit indicated by "1" belongs to the same sub-channel with a front adjacent RB; and the sub-channel indexes of the sub-channels are sequentially defined, and RBs included in a sub-channel corresponding to each of the sub-channel indexes are uniquely determined.

In an alternative embodiment, when the sub-channel configuration is indicated by the system broadcast message and/or the high-layer signaling, on available RBs in the system, a position of a starting RB of each of the sub-channels is indicated, where the starting RB of each of the sub-channels is indicated by an actual physical RB index or a logical RB index, and all available RBs whose indexes are after the index of the starting RB of each of the sub-channels and before an index of a starting RB of a next one of the sub-channels are included in the sub-channel.

The sub-channel indexes of the sub-channels are sequentially defined, and RBs included in a sub-channel corresponding to each of the sub-channel indexes are uniquely determined.

In an alternative embodiment, when the sub-channel configuration is indicated by the system broadcast message and/or the high-layer signaling, sub-channels comprising a same quantity of RBs are classified into a same type, a quantity of RBs included in each type of the sub-channels and a quantity of the types of the sub-channels are indicated, and each type of the sub-channels is corresponded to available RBs in the system according to an indicated sequence to determine the sub-channel configuration of the system.

The sub-channel indexes of the sub-channels are sequentially defined, and RBs included in a sub-channel corresponding to each of the sub-channel indexes are uniquely determined.

In an alternative embodiment, when the quantity of the RBs included in each type of sub-channels and the quantity of the types of the sub-channels are indicated so as to determine the sub-channel configuration of the system, an incremental indication method is used for indicating the quantity of RBs included in each type of the sub-channels by indicating a value by which the quantity of RBs included in a current type of the sub-channels is increased from the quantity of RBs included in a previous type of the sub-channels, so that the quantity of RBs included in each sub-channel in the current type is determined.

In an alternative embodiment, multiple sets of sub-channel configurations are indicated at a same time in the system for different resource pools and/or subframes.

In another aspect of embodiments of the present disclosure, a computer-readable storage medium is provided. The computer-readable storage medium is configured to store computer-executable instructions for executing any resource configuration method and device described above.

According to the solution provided by embodiments of the present disclosure, frequency-domain resource blocks (RBs) in a system are assigned to one or more sub-channels to form a sub-channel configuration in the system, where each of the RBs is included in only one sub-channel, a unique sub-channel index is determined for each sub-channel, and the RBs included in the one or more sub-channels used for carrying control information and/or data information of a user equipment are instructed through the sub-channel index, thereby solving the problem of large overheads incurred by indicating configured time-domain/frequency-domain resources in a V2V communication system and reducing overheads incurred by indicating configured time-domain/frequency-domain resources.

Other aspects can be understood after the accompanying drawings and detailed description are read and understood.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be detailed below with reference to the accompanying drawings in conjunction with the embodiments. If not in collision, the embodiments described herein and the features thereof may be combined with each other.

It is to be noted that the terms "first", "second" and the like in the description, claims and drawings of the present disclosure are used to distinguish between similar objects and are not necessarily used to describe a particular order or sequence.

Figure 1:
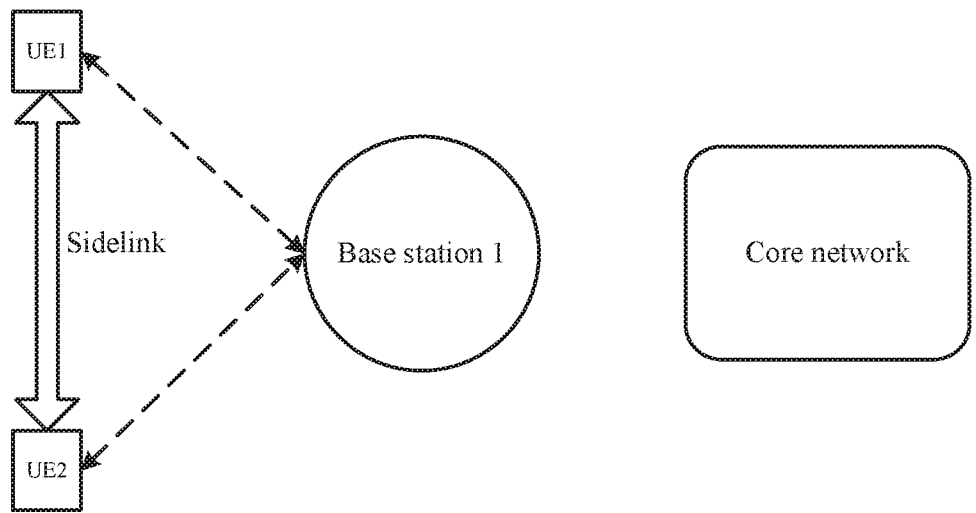
FIG. 1 is a schematic diagram of a D2D communication structure in the related art.
Figure 2:
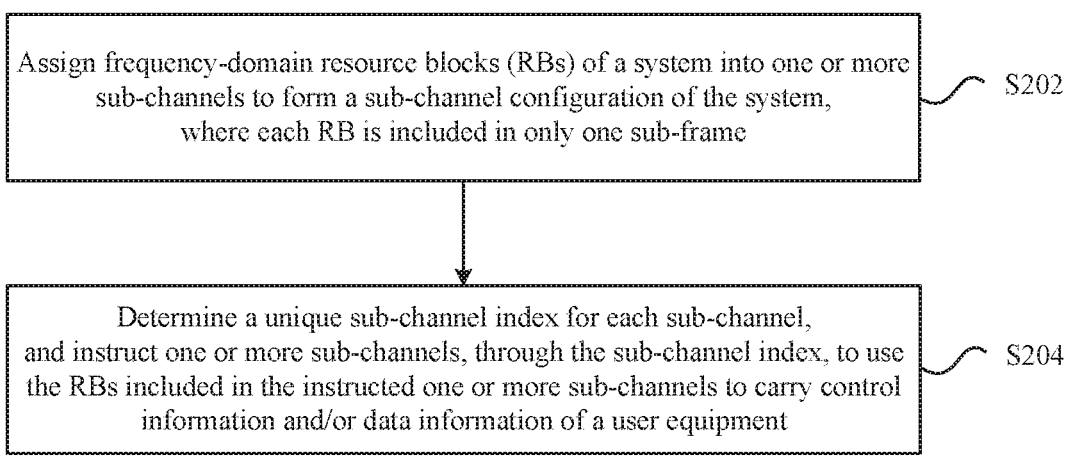
FIG. 2 is a flowchart of a resource configuration method according to an embodiment of the present disclosure.

Embodiments of the present disclosure provide a resource configuration method. FIG. 2 is a flowchart of the resource configuration method according to an embodiment of the present disclosure. As shown in FIG. 2, the method includes the steps described below.

In step S202, frequency-domain resource blocks (RBs) in a system are assigned to one or more sub-channels to form a sub-channel configuration for the system, where each of the RBs is included in only one sub-channel.

In step S204, a unique sub-channel index is determined for each sub-channel, and the one or more sub-channels are instructed through the sub-channel index to use the RBs included in corresponding sub-channel(s) used for carrying control information and/or data information of a user equipment is instructed through the sub-channel index(ex).

Through these steps, frequency-domain resource blocks (RBs) in a system are assigned to one or more sub-channels to form a sub-channel configuration for the system, where each of the RBs is in only one of the one or more sub-channels, each of the sub-channels is configured with a unique sub-channel index, and the RBs included in corresponding sub-channel(s) used for carrying control information and/or data information of a user equipment is instructed through the sub-channel index(es). The method solves the problem of large overheads incurred by indicating configured time-domain/frequency-domain resources in a V2V communication system and reduces overheads incurred by indicating configured time-domain/frequency-domain resources.

In this embodiment of the present disclosure, each sub-channel includes one or more RBs in frequency domain and one subframe in time domain.

In this embodiment of the present disclosure, the sub-channel configuration is used for indicating assignment of the sub-channels on consecutive physical RBs.

Alternatively, the sub-channel configuration is used for indicating consecutive logical RBs of sub-channels assignment, where a mapping rule is built between the consecutive logical RBs and the physical RBs.

In this embodiment of the present disclosure, when the one or more sub-channels are used for carrying the control information and the data information, the control information is carried using one of the following manners.

On time-domain resources of the one or more sub-channels, the control information is mapped onto and carried by all available symbols in a subframe, and on frequency-domain resources of the sub-channel, the control information is mapped onto and carried by one or more fixed RBs.

On the time-domain resources of the one or more sub-channels, the control information is mapped onto and carried by one or more fixed symbols in the subframe, and on the frequency-domain resources of the one or more sub-channels, the control information is mapped onto and carried by all RBs included in the sub-channel.

On the time-domain resources of the one or more sub-channels, the control information is mapped onto and carried by the one or more fixed symbols in the subframe, and on the frequency-domain resources of the one or more sub-channels, the control information is mapped onto and carried by one or more fixed RBs.

The symbols are Single-Carrier Frequency-Division Multiple Access (SC-FDMA) symbols or Orthogonal Frequency-Division Multiplexing (OFDM) symbols of the subframe.

In this embodiment of the present disclosure, the sub-channel configuration is indicated using at least one of the following manners.

The sub-channel configuration is predefined by the system. The sub-channel configuration is indicated by a system broadcast message. The sub-channel configuration indicated by high-layer signaling.

In this embodiment of the present disclosure, when the sub-channel configuration is predefined by the system, the quantity of the RBs and positions of RBs included in each of the sub-channels are predefined by the system, sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, the quantity of the RBs and positions of RBs included in each of the sub-channels are indicated by the system broadcast message and/or the high-layer signaling, sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, each of the sub-channels is configured to have a same number of RBs, the quantity of RBs included in each of the sub-channels is indicated, or a quantity of the sub-channels obtained by resource assignment is indicated, sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, a sub-channel configuration on m RBs is indicated, where m is a positive integer less than a total number of the available RBs in the system.

The sub-channel configuration on the m RBs is repeated on the available RBs in the system, the sub-channel configuration on all the available RBs in the system is determined, sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, a bitmap sequence is used to indicate the sub-channel configuration, where a length the bitmap sequence is equal to the quantity of the available RBs in the system, and bits in the bitmap sequence are in one-to-one correspondence with the available RBs in the system.

In the bitmap sequence, in the bitmap sequence, an RB corresponding to a bit indicated by "1" is used as a starting RB of the sub-channel; and an RB corresponding to a bit indicated by "0" belongs to a same sub-channel with a front adjacent RB.

Alternatively, in the bitmap sequence, the RB corresponding to the bit indicated by "0" is used as the starting RB of the sub-channel; and the RB corresponding to the bit indicated by "1" belongs to the same sub-channel with a front adjacent RB.

The sub-channel indexes of the sub-channels are sequentially defined, and RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, a position of a starting RB of each of the sub-channels is indicated, where the starting RB of each of the sub-channels is indicated by an actual physical RB index or a logical RB index, and all available RBs whose indexes are after the index of the starting RB of each of the sub-channels and before an index of a starting RB of a next one of the sub-channels are included in the sub-channel.

Sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, sub-channels having a same quantity of RBs are classified into a same type, the quantity of RBs included in each type of the sub-channels and the quantity of the types of the sub-channels are indicated, and each type of the sub-channels is corresponded to available RBs in the system according to an indicated sequence to determine the sub-channel configuration of the system.

The sub-channel indexes of the sub-channels are sequentially defined, and the RBs included in a sub-channel corresponding to each of the sub-channel indexes are uniquely determined.

In this embodiment of the present disclosure, when the quantity of the RBs included in the each type of the sub-channels and the quantity of the types of the sub-channels are indicated so as to determine the sub-channel configuration in the system, an incremental indication method is used for indicating the quantity of RBs included in each type of the sub-channels by indicating a value by which the quantity of RBs included in a current type of the sub-channels is increased from the quantity of RBs included in a previous type of the sub-channels, so that the quantity of RBs included in each sub-channel in the current type is determined.

In this embodiment of the present disclosure, multiple sets of the sub-channel configurations are indicated simultaneously in the system so as to be used for different resource pools and/or subframes.

In this embodiment of the present disclosure, when the one or more sub-channels are used for carrying the control information and the data information or when the one or more sub-channels are used for carrying the data information, the data information is carried using one of the following modes.

On time-domain resources of the one or more sub-channels, the data information is mapped onto and carried by all available symbols in a subframe, and on frequency-domain resources of the one or more sub-channels, the data information is mapped onto and carried by one or more fixed RBs.

On the time-domain resources of the one or more sub-channels, the data information is mapped onto and carried by one or more fixed symbols in the subframe, and on the frequency-domain resources of the one or more sub-channels, the data information is mapped onto and carried by all RBs included in the sub-channel.

On the time-domain resources of the one or more sub-channels, the data information is mapped onto and carried by the one or more fixed symbols in the subframe, and on the frequency-domain resources of the one or more sub-channels, the data information is mapped onto and carried by the one or more fixed RB.

In this embodiment of the present disclosure, when the one or more sub-channels are used for carrying the control information and/or the data information of the user equipment, the sub-channel includes a control information resource domain and a data information resource domain.

The control information resource domain of the one or more sub-channels is used for carrying the control information of the user equipment, and the data information resource domain of the one or more sub-channels is used for carrying the data information of the user equipment.

In this embodiment of the present disclosure, resources included in the control information resource domain and the data information resource domain in the one or more sub-channels are as follows.

In resources of the each of the sub-channels, resources excluding resources included in the control information resource domain are resources included in the data information resource domain.

In this embodiment of the present disclosure, the control information resource domain in the one or more sub-channels is indicated by at least one of the following manners.

The control information resource domain in the one or more sub-channels is predefined by the system. The control information resource domain in the one or more sub-channels is indicated by a system broadcast message. The control information resource domain in the one or more sub-channels is indicated by high-layer signaling.

In this embodiment of the present disclosure, when the resource configuration of the control information resource domain in the one or more sub-channels is predefined by the system, resources included in the control information resource domain in the one or more sub-channels are predefined by the system.

In this embodiment of the present disclosure, when the resource configuration of the control information resource domain and the data information resource domain is indicated by a system broadcast message and/or high-layer signaling, resources included in the control information resource domain in the one or more sub-channels are indicated by the system broadcast message and/or the high-layer signaling.

In this embodiment of the present disclosure, the resources included in the control information resource domain in the one or more sub-channels are configured in one of the following manners.

On time-domain resources of the one or more sub-channels, the control information resource domain includes all available symbols in a subframe, and on frequency-domain resources of the sub-channel, the control information resource domain includes one or more fixed RBs.

On the time-domain resources of the one or more sub-channels, the control information resource domain includes one or more fixed symbols in the subframe, and on the frequency-domain resources of the one or more sub-channels, the control information resource domain includes all RBs.

On the time-domain resources of the one or more sub-channels, the control information resource domain includes the one or more fixed symbols in the subframe, and on the frequency-domain resources of the one or more sub-channels, the control information resource domain includes the one or more fixed RBs.

In this embodiment of the present disclosure, the resources included in the data information resource domain in the one or more sub-channels are configured in one of the following manners.

On time-domain resources of the one or more sub-channels, the data information resource domain includes all available symbols in a subframe, and on frequency-domain resources of the sub-channel, the data information resource domain includes one or more fixed RBs.

On the time-domain resources of the one or more sub-channels, the data information resource domain includes one or more fixed symbols in the subframe, and on the frequency-domain resources of the one or more sub-channels, the data information resource domain includes all RBs.

On the time-domain resources of the one or more sub-channels, the data information resource domain includes the one or more fixed symbols in the subframe, and on the frequency-domain resources of the one or more sub-channels, the data information resource domain includes the one or more fixed RBs.

Embodiments of the present disclosure further provide a resource configuration device for implementing the above-mentioned embodiments and preferred implementation modes. What has been described will not be repeated. As used below, the term "module" may be software, hardware or a combination thereof capable of implementing preset functions. The device in the embodiment described below is preferably implemented by software, but implementation by hardware or by a combination of software and hardware is also possible and conceived.

Figure 3:
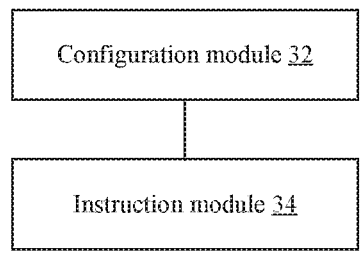
FIG. 3 is a block diagram of a resource configuration device according to an embodiment of the present disclosure.

FIG. 3 is a block diagram of a resource configuration device according to an embodiment of the present disclosure. As shown in FIG. 3, the device includes: a configuration module 32 and an instruction module 34.

The configuration module 32 is configured to assign frequency-domain resource blocks (RBs) in a system to one or more sub-channels to form a sub-channel configuration for the system, where each of the RBs is included in only one sub-channel.

The instruction module 34 is configured to determine a unique sub-channel index for each sub-channel, and instruct the one or more sub-channels, through the sub-channel index, to use the RBs included in the instructed one or more sub-channels to carry control information and/or data information of a user equipment.

In the above device, the configuration module 32 is configured to allocate frequency-domain resource blocks (RBs) in a system to one or more sub-channels to form a sub-channel configuration of the system, where each of the RBs is in only one of the one or more sub-channels; and the instruction module 34 is configured to configure a unique sub-channel index for each of the sub-channels, and instruct, through the sub-channel index(es), to use the RBs included in a corresponding one of the one or more sub-channels to carry control information and/or data information of a user equipment. The device solves the problem of large overheads incurred by indicating configured time-domain/frequency-domain resources in a V2V communication system and reduces overheads incurred by indicating configured time-domain/frequency-domain resources.

In this embodiment of the present disclosure, each sub-channel comprises one or more RBs in frequency domain and one subframe in time domain.

In this embodiment of the present disclosure, the sub-channel configuration is used for indicating assignment of the sub-channels on consecutive physical RBs.

Alternatively, the sub-channel configuration is used for indicating consecutive logical RBs of sub-channels assignment, where a mapping rule is built between the consecutive logical RBs and the physical RBs.

In this embodiment of the present disclosure, when the one or more sub-channels are used for carrying the control information and the data information, the control information is carried using one of the following manners.

On time-domain resources of the one or more sub-channels, the control information is mapped onto and carried by all available symbols in a subframe, and on frequency-domain resources of the one or more sub-channels, the control information is mapped onto and carried by one or more fixed RBs.

On the time-domain resources of the one or more sub-channels, the control information is mapped onto and carried by one or more fixed symbols in the subframe, and on the frequency-domain resources of the one or more sub-channels, the control information is mapped onto and carried by all RBs included in the sub-channel.

On the time-domain resources of the one or more sub-channels, the control information is mapped onto and carried by the one or more fixed symbols in the subframe, and on the frequency-domain resources of the one or more sub-channels, the control information is mapped onto and carried by one or more fixed RBs, The symbols are Single-Carrier Frequency-Division Multiple Access (SC-FDMA) symbols or Orthogonal Frequency-Division Multiplexing (OFDM) symbols of the subframe.

In this embodiment of the present disclosure, the sub-channel configuration is indicated using at least one of the following manners.

The sub-channel configuration is predefined by the system. The sub-channel configuration is indicated by a system broadcast message. The sub-channel configuration is indicated by high-layer signaling.

In this embodiment of the present disclosure, when the sub-channel configuration is predefined by the system, the quantity of the RBs and positions of RBs included in the each of the sub-channels are predefined by the system, sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, the quantity and positions of RBs included in the each of the sub-channels are indicated by the system broadcast message and/or the high-layer signaling, sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, each of the sub-channels is configured to have a same number of RBs, a number of RBs included in the each of the sub-channels is indicated, or a quantity of the sub-channels is indicated, the sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, a sub-channel configuration on m RBs is indicated, where m is a positive integer less than the total number of the available RBs in the system.

The sub-channel configuration on the m RBs is repeated on the available RBs in the system, and thus the sub-channel configuration on all of the available RBs in the system is determined. The sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, a bitmap sequence is used to indicate the sub-channel configuration. A length the bitmap sequence is equal to the quantity of the available RBs in the system, and bits in the bitmap sequence are in one-to-one correspondence with the available RBs in the system.

In the bitmap sequence, an RB corresponding to a bit indicated by "1" is used as a starting RB of the sub-channel, and an RB corresponding to a bit indicated by "0" belongs to a same sub-channel with a front adjacent RB.

Alternatively, in the bitmap sequence, the RB corresponding to the bit indicated by "0" is used as the starting RB of the sub-channel; and the RB corresponding to the bit indicated by "1" belongs to the same sub-channel with a front adjacent RB.

The sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, on available RBs in the system, a position of a starting RB of each of the sub-channels is indicated. The starting RB of each of the sub-channels is indicated by an actual physical RB index or a logical RB index, and all available RBs whose indexes are after the index of the starting RB of each of the sub-channels and before an index of a starting RB of a next one of the sub-channels are included in the sub-channel.

The sub-channel indexes of the sub-channels are sequentially defined, and the RBs included in a sub-channel corresponding to each of the sub-channel indexes are uniquely determined.

In this embodiment of the present disclosure, when the sub-channel configuration is indicated by the system broadcast message and/or the high-layer signaling, sub-channels having a same quantity of RBs are classified into a same type, the quantity of RBs included in each type of the sub-channels and the quantity of the types of the sub-channels are indicated, and each type of the sub-channels is corresponded to available RBs in the system according to an indicating sequence to determine the sub-channel configuration of the system.

The sub-channel indexes of the sub-channels are sequentially defined, and the RBs included in a sub-channel corresponding to each of the sub-channel indexes are uniquely determined.

In this embodiment of the present disclosure, when the quantity of the RBs included in each type of sub-channels and the quantity of the types of the sub-channels are indicated so as to determine the sub-channel configuration of the system, an incremental indication method is used for indicating the quantity of RBs included in each type of the sub-channels by indicating a value by which the quantity of RBs included in a current type of the sub-channels is increased from the quantity of RBs included in a previous type of the sub-channels, so that the quantity of RBs included in each sub-channel in the current type is determined.

In this embodiment of the present disclosure, multiple sets of the sub-channel configuration are indicated simultaneously in the system so as to be used for different resource pools and/or subframes.

In this embodiment of the present disclosure, when the one or more sub-channels are used for carrying the control information and the data information or when the one or more sub-channels are used for carrying the data information, the data information is carried in one of the following manners.

On time-domain resources of the one or more sub-channels, the data information is mapped onto and carried by all available symbols in a subframe, and on frequency-domain resources of the one or more sub-channels, the data information is mapped onto and carried by one or more fixed RBs.

On the time-domain resources of the one or more sub-channels, the data information is mapped onto and carried by one or more fixed symbols in the subframe, and on the frequency-domain resources of the one or more sub-channels, the data information is mapped onto and carried by all RBs included in the sub-channel.

On the time-domain resources of the one or more sub-channels, the data information is mapped onto and carried by the one or more fixed symbols in the subframe, and on the frequency-domain resources of the one or more sub-channels, the data information is mapped onto and carried by the one or more fixed RB.

In this embodiment of the present disclosure, when the one or more sub-channels are used for carrying the control information and/or the data information of the user equipment, the sub-channel includes a control information resource domain and a data information resource domain.

The control information resource domain of the one or more sub-channels is used for carrying the control information of the user equipment, and the data information resource domain of the one or more sub-channels is used for carrying the data information of the user equipment.

In this embodiment of the present disclosure, resources included in the control information resource domain and resources included in the data information resource domain in the one or more sub-channels are configured as follows.

In resources of the each of the sub-channels, resources excluding resources included in the control information resource domain are resources included in the data information resource domain.

In this embodiment of the present disclosure, the control information resource domain in the one or more sub-channels is indicated in at least one of the manners.

The control information resource domain is predefined by the system. The control information resource domain is indicated by a system broadcast message. The control information resource domain is indicated by high-layer signaling.

In this embodiment of the present disclosure, when the resource configuration of the control information resource domain in the one or more sub-channels is predefined by the system, the resources included in the control information resource domain in the one or more sub-channels are predefined by the system.

In this embodiment of the present disclosure, when the resource configuration of the control information resource domain and the resource configuration of the data information resource domain are indicated by a system broadcast message and/or high-layer signaling, resources included in the control information resource domain in the one or more sub-channels are indicated by the system broadcast message and/or the high-layer signaling.

In this embodiment of the present disclosure, the resources included in the control information resource domain in the one or more sub-channels are configured in one of the following manners.

On time-domain resources of the one or more sub-channels, the control information resource domain includes all available symbols in a subframe, and on frequency-domain resources of the sub-channel, the control information resource domain includes one or more fixed RBs.

On the time-domain resources of the one or more sub-channels, the control information resource domain includes one or more fixed symbols in the subframe, and on the frequency-domain resources of the one or more sub-channels, the control information resource domain includes all RBs.

On the time-domain resources of the one or more sub-channels, the control information resource domain includes the one or more fixed symbols in the subframe, and on the frequency-domain resources of the one or more sub-channels, the control information resource domain includes the one or more fixed RBs.

In this embodiment of the present disclosure, the resources included in the data information resource domain in the one or more sub-channels are configured in one of the following manners.

On time-domain resources of the one or more sub-channels, the data information resource domain includes all available symbols in a subframe, and on frequency-domain resources of the sub-channel, the data information resource domain includes one or more fixed RBs.

On the time-domain resources of the one or more sub-channels, the data information resource domain includes one or more fixed symbols in the subframe, and on the frequency-domain resources of the one or more sub-channels, the data information resource domain includes all RBs.

On the time-domain resources of the one or more sub-channels, the data information resource domain includes the one or more fixed symbols in the subframe, and on the frequency-domain resources of the one or more sub-channels, the data information resource domain includes the one or more fixed RBs.

The present disclosure will be detailed below in conjunction with preferred embodiments and examples.

Preferred embodiments of the present disclosure provide a resource configuration method and device, which are used to indicate configuration of resource blocks (RBs) in available frequency domain so that the RBs form sub-channel resources for carrying control and/or data information, thereby achieving the effects of reducing the resource indication overheads, reducing the resource usage conflict probability, improving the system resource utilization rate and reducing the blind detection complexity.

A network includes one or more of the following entities: evolved NodeB (eNB), Relay Node (RN), Multi-cell Coordination Entity (MCE), GateWay (GW), Mobile Management Entity (MME), Evolved Universal Terrestrial Radio Access Network (EUTRAN), and Operation Administration and Maintenance (OAM) Manager. The following description is made using an example in which an eNB is used as a network entity.

Figure 4:
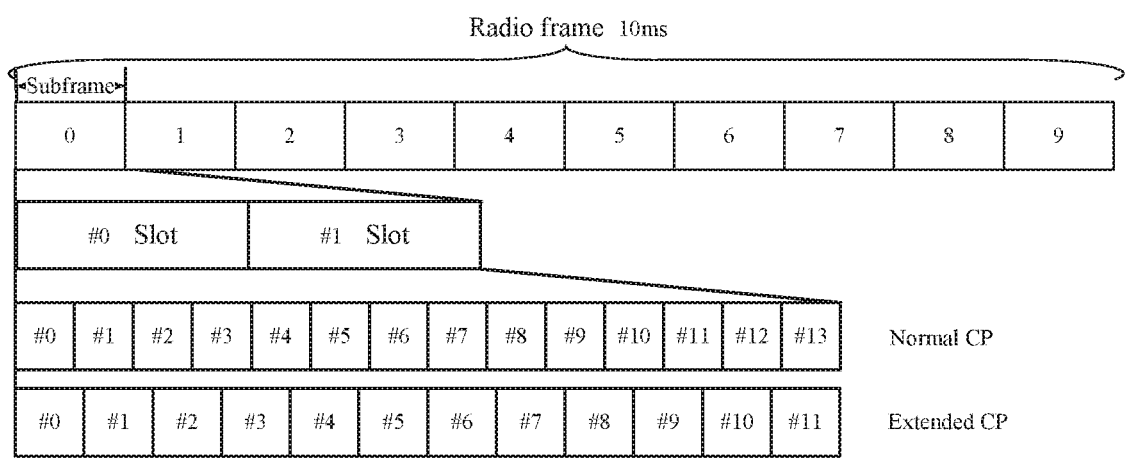
FIG. 4 is a schematic diagram of a frame structure in an LTE system in the related art.
Figure 5:
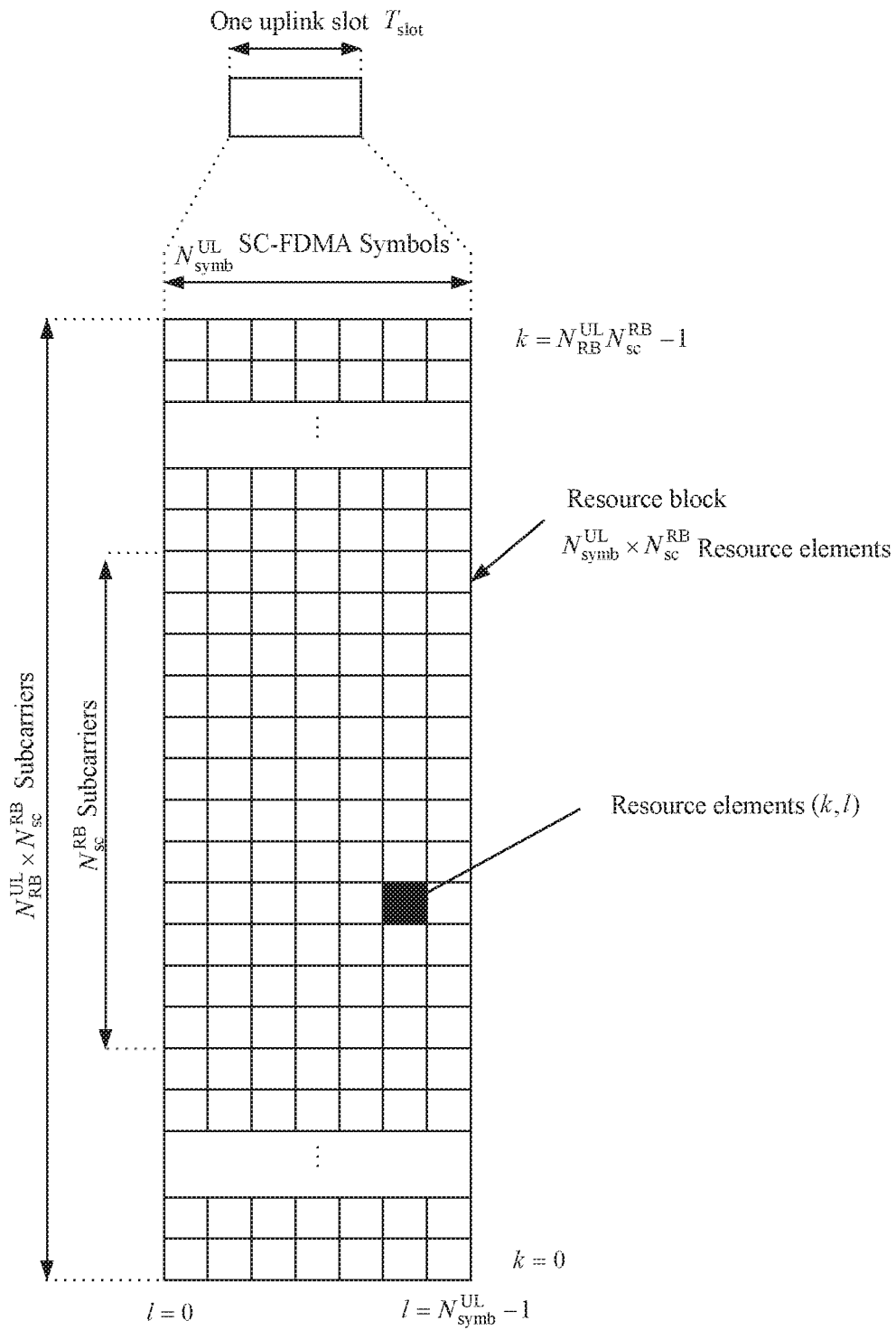
FIG. 5 is a schematic diagram of a resource block (RB) structure in an LTE system in the related art.

In a conventional cellular communication system, radio resources of a UE are uniformly controlled and scheduled by the eNB, the eNB indicates configured downlink or uplink resources of the UE, and the UE receives eNB-transmitted data signals on the corresponding downlink resources according to configuration indication of the eNB or transmits signals to the eNB on the uplink resources. In an LTE system, radio resources are divided in units of radio frames in time domain. The length of each radio frame is 10 ms and each radio frame includes 10 subframes. The length of each subframe is 1 ms and each subframe is divided into two slots each of which is 0.5 ms. FIG. 4 is a schematic diagram of a frame structure in an LTE system. When the system frame structure uses a Normal Cyclic Prefix (Normal CP), each subframe includes 14 Single-carrier Frequency Division Multiple Access (SC-FDMA) symbols or Orthogonal Frequency Division Multiplexing (OFDM) symbols, and each slot includes 7 symbols. When the system frame structure uses an Extended Cyclic Prefix (Extended CP), each subframe includes 12 symbols and each slot includes 6 symbols. In frequency domain, resources are divided in units of subcarriers and each subcarrier includes 15 kHz or 7.5 kHz resources. According to the time domain unit and frequency-domain resource unit, the smallest unit of the time-frequency resources scheduled by the eNB for the UE is Resource Block (RB). RB is defined to be 1 slot in the time domain and to be $N_{SC}^{RB}$ consecutive subcarriers in the frequency domain, where $N_{SC}^{RB}=12, 24$. FIG. 5 is a schematic diagram of a resource block (RB) structure in an LTE system. The eNB can dynamically schedule and configure the required resources flexibly according to UE requirements.

In an LTE-based D2D communication system, system uplink subframes are used as Physical Sidelink Shared Channel (PSSCH) subframes to transmit D2D data. A D2D transmitting UE indicates the used PSSCH resources through sidelink (that is, D2D link) Sidelink Control Information (SCI). As a special application of a D2D communication, a V2V system can use the D2D communication solution, that is, use SCI to indicate the corresponding data channel resource configuration and transmit V2V data information on the corresponding data channel resources.

Figure 6:
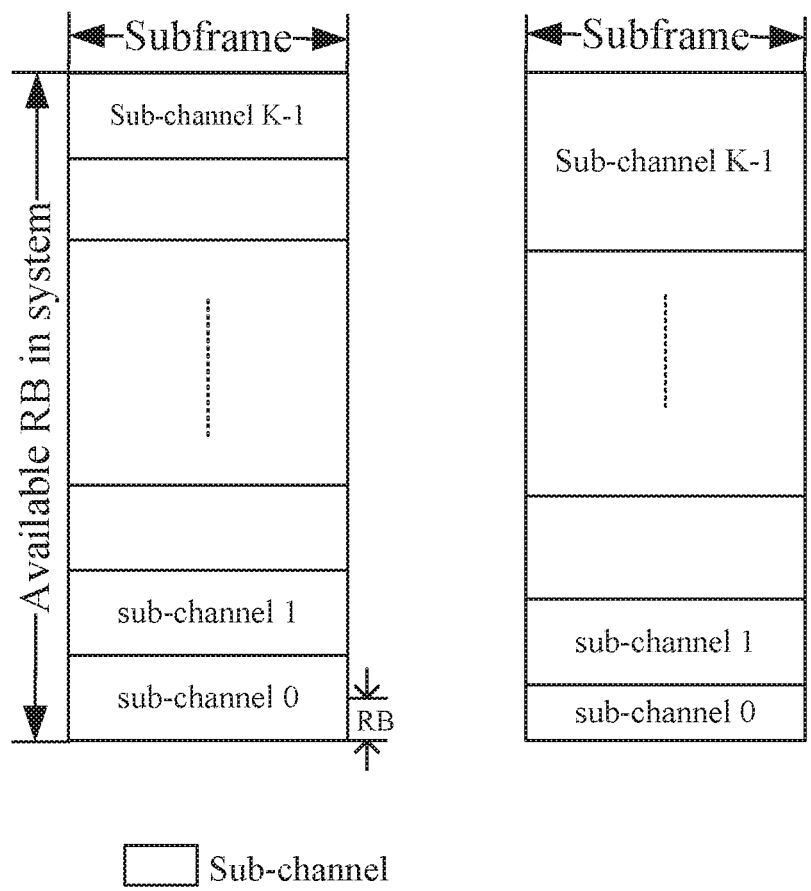
FIG. 6 is a schematic diagram of a sub-channel configuration solution for assigning frequency-domain resources to multiple sub-channels according to a preferred embodiment of the present disclosure.

In the case of special application requirements and scenarios such as V2V, the data format, packet size and transmission mode in data transmission of the UE are relatively steady. In this case, configuration indication for UE resources does not require strong flexibility. Frequency-domain resources available to the system may be assigned to multiple sub-channels. Each sub-channel includes one or more RBs. The quantity of the RBs and the positions of the RBs are fixed. Each sub-channel includes one subframe in the time domain. FIG. 6 is a schematic diagram of a sub-channel configuration solution for assigning frequency-domain resources to multiple sub-channels according to a preferred embodiment of the present disclosure. Available frequency-domain RBs are determined and configured according to sub-channels, and resources are indicated on the basis of the sub-channel configuration. For example, the RBs used for carrying and transmitting control indication information (such as SCI) and/or data information are instructed through sub-channel indexes.

Figure 7:
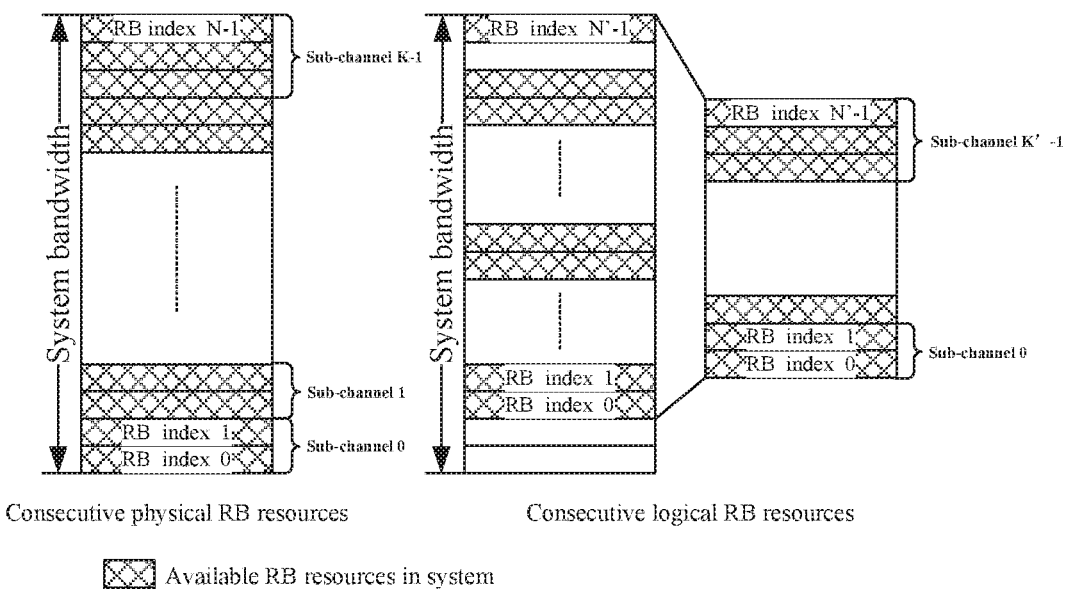
FIG. 7 is a schematic diagram of a configuration of sub-channels mapped onto consecutive physical RBs and consecutive logical RBs according to a preferred embodiment of the present disclosure.

It is to be noted that the frequency-domain resources of the system include several RBs. The available RBs in the system refer to RBs that can be used for carrying signals in a communication system (such as a D2D or V2V system). The available RBs may be actual consecutive physical RB resources within a system bandwidth or may be multiple non-consecutive physical RB resources. When the actual available RBs are non-consecutive physical RBs, the non-consecutive RBs may be logically numbered sequentially to form logically consecutive RB resources. FIG. 7 is a schematic diagram of the sub-channel configuration being mapped onto consecutive physical RBs and consecutive logical RBs according to a preferred embodiment of the present disclosure. In the description of the present disclosure, the assignment and indication methods for sub-channels are applicable to both the process of mapping the sub-channel configuration to the consecutive physical RBs and the process of mapping the sub-channel configuration to the consecutive logical RBs. When the actual available RBs in a system are logical RBs, the method described in the present disclosure is used for configuring and indicating logically consecutive RBs, and achieves the function of assigning physical RB resources and configuring the sub-channels according to a mapping between the logical RBs and the actual RBs.

Sub-channel configuration information about assigning the available RBs in the system to multiple sub-channels needs to be notified to a UE in the system in a certain manner. The sub-channel configuration information is public information and should be known to all available UEs. The sub-channel configuration information may be predefined by the system, indicated by a system broadcast message (System Information Block (SIB)), or indicated by high-layer signaling, such as a Radio Resource Control (RRC) message. A network or a UE having the right to send sub-channel configuration may indicate, through corresponding signaling, the used sub-channel configuration.

When the sub-channel configuration is predefined by the system, the quantity of RBs and the positions of RBs included in each sub-channel are predefined by the system, and further, the sub-channel indexes of the sub-channels are sequentially defined, so that the RBs included in a sub-channel corresponding to each of the sub-channel indexes are uniquely determined.

On the basis of the sub-channel configuration, an eNB may indicate scheduled sub-channel resources to a transmitting UE and/or a receiving UE by indicting sub-channel indexes, where the sub-channel resources are used for carrying control information and/or data information of the UE, and the UE may also select, from available sub-channel resources, one or more sub-channels for carrying and sending the control information and/or the data information.

Figure 8A:
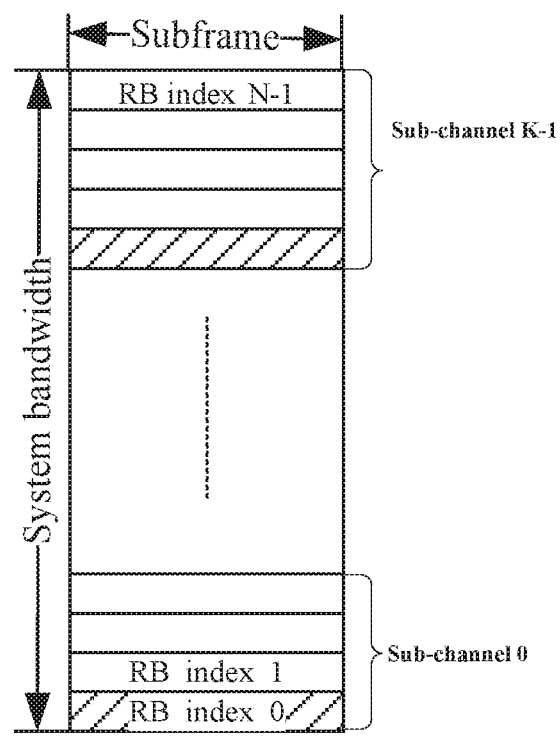
FIG. 8a is a schematic diagram of a first manner of mapping and carrying control information when the control information and data information are both carried by one sub-channel according to a preferred embodiment of the present disclosure.
Figure 8A:
Figure 8B:
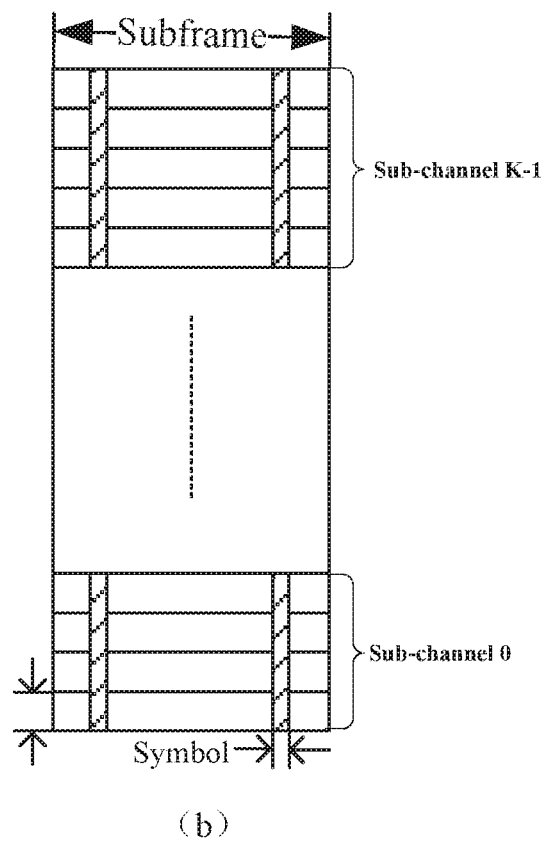
FIG. 8b is a schematic diagram of a second manner of mapping and carrying control information when the control information and data information are both carried by one sub-channel according to a preferred embodiment of the present disclosure.
Figure 8C:
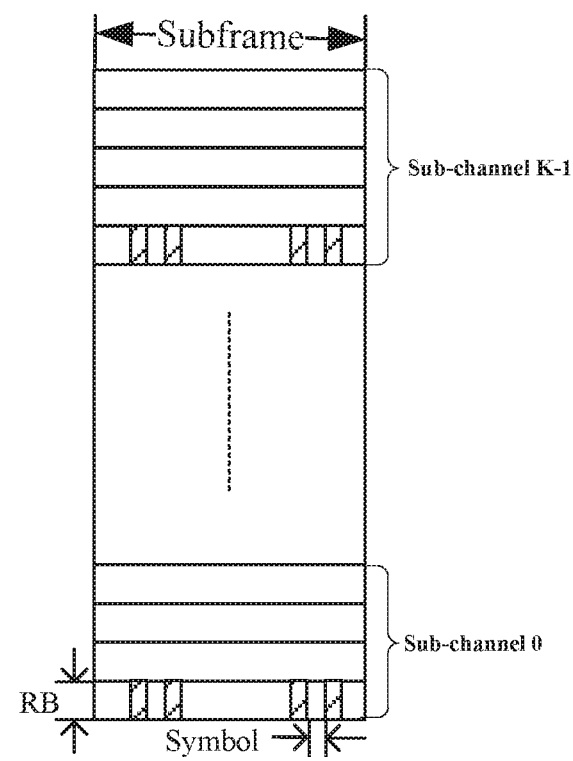
FIG. 8c is a schematic diagram of a third manner of mapping and carrying control information when the control information and data information are both carried by one sub-channel according to a preferred embodiment of the present disclosure.
Figure 8C:

When the one or more sub-channels are used for carrying both of the control information and the data information, the control information (for example, SCI) may be mapped onto and carried by a fixed position in the sub-channel. For example, on frequency domain, the control information is fixedly mapped onto one or more RBs in the sub-channel. For example, the control information is mapped onto and carried by the first RB of the sub-channel. On the time domain, the control information is mapped onto all available symbols in a subframe. FIG. 8a is a first schematic diagram of a manner of mapping and carrying control information when the control information and data information are both carried by one sub-channel according to a preferred embodiment of the present disclosure. Alternatively, the control information is mapped onto one or more fixed symbols in the time domain—and is mapped onto all RBs in the sub-channel in the frequency domain, for example, symbols #3 and #10. FIG. 8b is a second schematic diagram of a manner of mapping and carrying control information when the control information and data information are both carried by one sub-channel according to a preferred embodiment of the present disclosure. Alternatively, the control information is fixedly mapped onto one or more fixed symbols of one or more fixed RBs, for example, symbols #2, #4, #9 and #11 of the first RB of the sub-channel FIG. 8c is a third schematic diagram of a manner of mapping and carrying control information when the control information and data information are both carried by one sub-channel according to a preferred embodiment of the present disclosure. When SCI and data are both carried by the sub-channel, the mapping resources of the SCI is predefined as a fixed way by the system.

When the assignment of the sub-channels in the system is indicated by a SIB message or an RRC message, the specific indication method includes one or more of the following methods.

Method 1: Sub-Channel Configuration is Indicated Directly.

The quantity of RBs included in each sub-channel is directly indicated by signaling so as to indicate the sub-channel configuration of the system. This method has the advantages of being simple, providing a sufficient and flexible sub-channel assignment manner and being capable of achieving any RB allocation effect.

Example 1

A system indicates sub-channel configuration to a UE through a SIB message. The number of available RBs in the system is 50. The sub-channel configuration indicated in the SIB message is [5, 5, 5, 10, 10, 15], totaling 50 RBs. That is, according to the sequence numbers of physical RBs, sub-channel index 0 includes RB whose RB index is 0 to RB whose RB index is 4, sub-channel index 1 includes RB whose RB index is 5 to RB whose RB index is 9, and so on.

Method 2: The Number of Sub-Channels or the Number of RBs Included in Each Sub-Channel is Indicated.

The total number of available RB resources in a system is a known value. When RBs are equally assigned among sub-channels, that is, when each sub-channel includes the same number of RBs, indication of the sub-channel configuration of the system may be determined by indicating the number of sub-channels or the number of RBs included in each sub-channel. This method has the advantages of being simple and being applicable to a scenario with relatively uniform service attributes.

Example 2

A system indicates a sub-channel configuration to a UE through a SIB message. The number of available RBs in the system is 50. The total number of configured sub-channels indicated in the SIB message is 10. So it is determined, according to the total number of available RBs in the system, that each sub-channel includes 5 RBs. Alternatively, it is directly indicated in the SIB message that the number of RBs included in each sub-channel is 5. Further, according to the sequence numbers of physical RBs, sub-channel index 0 includes RB whose RB index is 0 to RB whose index is 4, sub-channel index 1 includes RB whose RB index is 5 to RB whose index is 9, and so on.

Method 3: Sub-Channel Configuration of a Segment is Indicated.

The system indicates the sub-channel configuration on m RBs, where m is less than the total number of available RBs in the system. Further, the sub-channel configuration on the m RBs is repeated on the available RBs in the system. In this way, the sub-channel configuration on all available RBs in the system is achieved. This method has the advantages of incurring relatively low indication overheads, indicating only the sub-channel configuration in a relatively small range and being applicable to a scenario with a relatively large total number of resources.

Example 3

Figure 9:
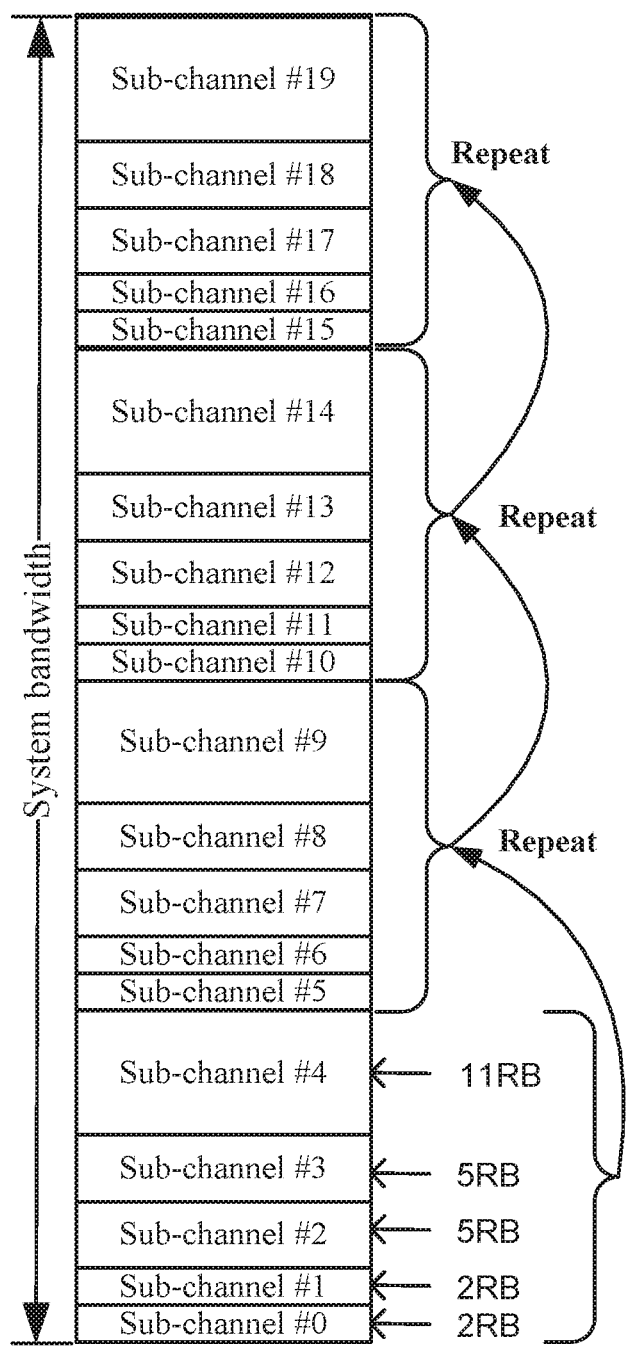
FIG. 9 is a schematic diagram illustrating that a third method for indicating a sub-channel configuration according to a preferred embodiment of the present disclosure.

The system indicates the sub-channel configuration to a UE through an RRC message. The number of available RBs in the system is 100. The indicated sub-channel configuration is [2, 2, 5, 5, 11]. That is, the sub-channel configuration of 25 RBs is indicated. Further, the configuration is repeated according to the sequence of physical RBs so that the sub-channel configuration is repeated 4 times in a system bandwidth to obtain the sub-channel configuration of all available RBs in the system, which includes 20 sub-channels. FIG. 9 is a schematic diagram illustrating that a third method for indicating a sub-channel configuration according to a preferred embodiment of the present disclosure.

Method 4: The Configuration of the Sub-Channels is Indicated by a Bitmap.

The number of available RBs in a system is the length of the bitmap. A bitmap sequence is indicated by signaling. Each bit in the bitmap sequence corresponds to one RB. That is, bits in the bitmap sequence are in one-to-one correspondence with RBs in the system. Further, in the bitmap sequence, an RB corresponding to a bit indicated by "1" is used as a starting RB of the sub-channel; and an RB corresponding to a bit indicated by "0" belongs to a same sub-channel with a front adjacent RB. Alternatively, a meaning indicated by bit "1" and a meaning indicated by bit "0" may exchange with each other. On this basis, the system indicates the sub-channel configuration through the bitmap sequence. How to allocate RBs in the system into sub-channels can be determined according to the indicating meaning of the bitmap. This method has the advantages of being simple and flexible, incurring stable overheads and can be used to implement any sub-channel configuration.

Example 4

The system indicates the sub-channel configuration to a V2V UE through an RRC message. A bitmap sequence which is the RRC message transmitted by an eNB for indicating the sub-channel configuration is "10000 10000 10000 00000 10000 00000 . . . ". That is, according to the sequence of RBs, RBs are assigned to sub-channels in the form of [5, 5, 10, 10, . . . ].

Method 5: The Position of a Starting RB of Each Sub-Channel is Indicated.

The position of the starting RB of each sub-channel is indicated by signaling so as to indicate system sub-channel configuration. The starting RB of each sub-channel may be indicated by actual physical RB indexes or RB indexes of consecutive logical RBs in a resource pool. One or more RBs which are arranged in the successive sequence from the RB corresponding to an indicated starting RB index of each sub-channel to a RB which is adjacent to and in front of an RB corresponding to an indicated starting RB index of a next sub-channel are included in a same sub-channel. This method has the advantages of being simple and flexible and can be used to implement any sub-channel configuration.

Example 5

Figure 10A:
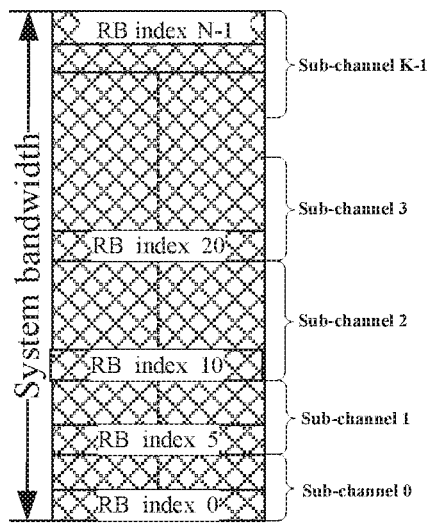
FIG. 10a is a first schematic diagram illustrating that the third method for indicating the sub-channel configuration according to a preferred embodiment of the present disclosure.
Figure 10B:
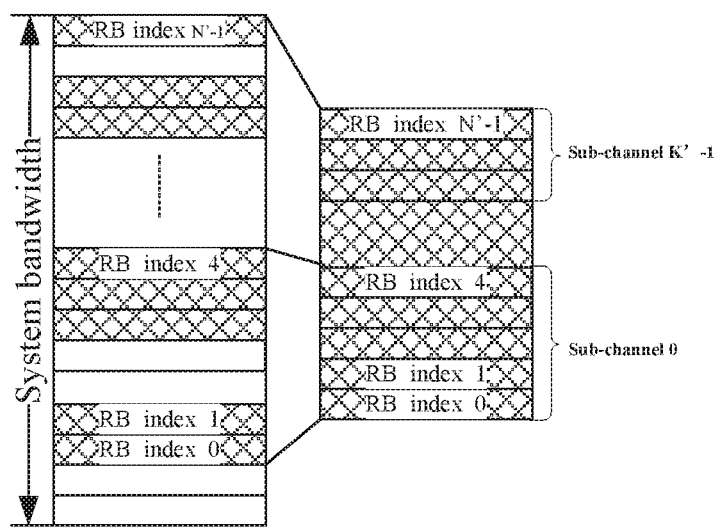
FIG. 10b is a second schematic diagram illustrating that the third method for indicating the sub-channel configuration according to a preferred embodiment of the present disclosure.

The system indicates the sub-channel configuration to a V2V UE through an RRC message. An eNB indicates in the RRC message that the starting RB indexes of the sub-channels are [0, 5, 10, 20, . . . ]. When indicated RB indexes correspond to physical RBs, the sub-channel configuration indicated by the signaling indicates that sub-channel #0 includes RB indexes 0 to 4, sub-channel #1 includes RB indexes 5 to 9, sub-channel #2 includes RB indexes 10 to 19, sub-channel #3 includes RB indexes 20 to 29, and so on. FIG. 10a is a first schematic diagram illustrating that the sub-channel configuration is indicated by means of the third method according to a preferred embodiment of the present disclosure. When indicated RB indexes correspond to consecutive logical virtual RBs, the sub-channel configuration indicated by the signaling indicates that the logical sub-channel #0 includes logical RB indexes 0 to 4, the logical sub-channel #1 includes logical RB indexes 5 to 9, the logical sub-channel #2 includes logical RB indexes 10 to 19, the logical sub-channel #3 includes logical RB indexes 20 to 29, . . . , and then actual sub-channel configuration is determined according to a mapping between logical RBs and physical RBs. FIG. 10*b* is a second schematic diagram illustrating that the sub-channel configuration is indicated by means of the third method according to a preferred embodiment of the present disclosure.

Method 6: The Numbers of Sub-Channels and the Number of RBs Included in Each Corresponding Sub-Channel are Indicated Sequentially.

When multiple sub-channels are configured in a system and different sub-channels include different numbers of RBs, sub-channels including the same number of RBs may be classified into one type. In this case, the system may determine sub-channel configuration by sequentially indicating the number of RBs included in each type of sub-channels and the number of the types and sequentially assigning available RBs in the system according to an indicated sequence. This method is applicable to a scenario with limited types of sub-channels. This method indicates system sub-channel configuration through limited indication overheads.

Example 6

A system indicates a sub-channel configuration to a UE through a SIB message. The number of available RBs in the system is 100 and the indication in the SIB message is [(10, 5), (5, 10)]. The two values in each pair of brackets indicate the number of sub-channels in one type of sub-channel configuration and the number of RBs included in each sub-channel. The effect of the above indication is that the total number of the first type of sub-channels is 10, where each sub-channel includes 5 RBs, and the number of the second type of sub-channels is 5, where each sub-channel includes 10 RBs. The available RBs in the system are sequentially assigned to sub-channels #0 to #9, where each sub-channel includes 5 RBs; and sub-channels #10 to #14, where each sub-channel includes 10 RBs. In this way, the sub-channel configuration of 100 RBs in the system is indicated.

Method 7: The Numbers of Sub-Channels are Indicated Sequentially and the Number of RBs Included in the Sub-Channel are Indicated by Indicating an Increment.

On the basis of method 6, the number of the RBs in each sub-channel of each type is indicated by a indicating the increment, such that the sub-channel configuration of the system may be determined.

Similarly, when multiple sub-channels are configured in the system and different sub-channels include different numbers of RBs, sub-channels including the same number of RBs may be classified into one type. In this case, the system may indicate the quantity of the RBs of the each type of sub-channel and the quantity of the sub-channels in each type, and allocate the available RBs in the system according to an indicated sequence so as to determine the sub-channel configuration. When the number of RBs in each type of sub-channels is indicated, the number of RBs included in the first type of sub-channels is indicated directly, and the number of RBs included in each subsequent type of sub-channels is indicated by indicating an increment, that is, a value by which the number of RBs included in the current type of sub-channels is increased from the number of RBs included in the previous type of sub-channels is indicated to determine the number of RBs included in the current type of sub-channels. This method is also applicable to a scenario with limited types of sub-channels. This method indicates system sub-channel configuration through limited indication overheads.

Example 7

The system indicates the sub-channel configuration to a UE through a SIB message. The number of available RBs in the system is 100 and the indication in the SIB message is [(6, 5), (3, 5), (2, 10)]. The two values in each pair of brackets indicate the number of sub-channels in this type of configured sub-channels and the incremental amount of the number of RBs included in each sub-channel relative to the previous type of sub-channels (in the first type of sub-channels, the second value is the actual number of RBs). The effect of the above indication is that the total number of the first type of sub-channels is 6, where each sub-channel includes 5 RBs, the number of the second type of sub-channels is 3, where each sub-channel includes 10 RBs, and the number of the third type of sub-channels is 2, where each sub-channel includes 20 RBs. The available RBs in the system are sequentially assigned into sub-channels #0 to #5, where each sub-channel includes 5 RBs; sub-channels #6 to #8, where each sub-channel includes 10 RBs; and sub-channels #9 and #10, where each sub-channel includes 20 RBs. In this way, the sub-channel configuration of 100 RBs in the system is indicated.

Example 8

When there are certain requirements in the system, the system needs to support multiple sub-channel configuration solutions. Different sub-channel configuration solutions may be defined for different resource pools and/or different subframes.

Figure 11:
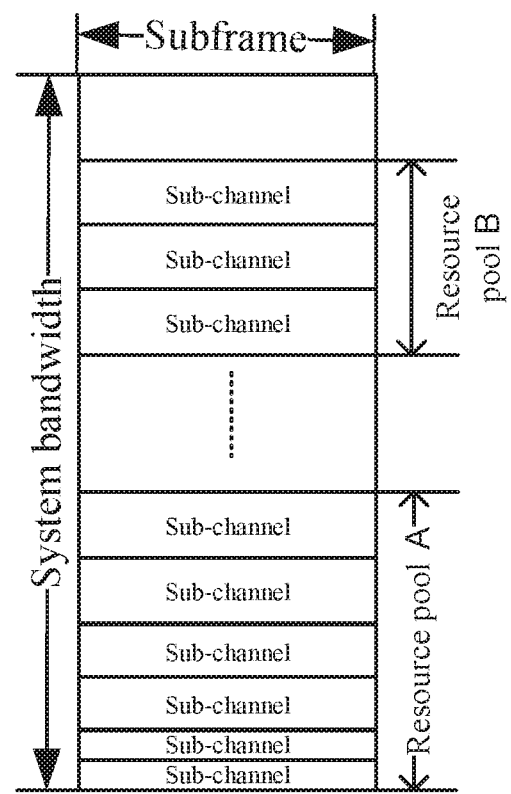
FIG. 11 is a first schematic diagram of the sub-channel configuration in an eighth example according to a preferred embodiment of the present disclosure.

For example, two resource pools are assigned on frequency domain in a system. The two resource pools include independent RBs, and do not include a same RB. According to service requirements, independent sub-channel configurations may be configured for the two resource pools respectively. FIG. 11 is a first schematic diagram of the sub-channel configuration in the example 8 according to a preferred embodiment of the present disclosure. The number of sub-channels included in the resource pool A is relatively large. The number of RBs included in each sub-channel in the resource pool A is relatively small. The resource pool A is applicable to a scenario in which user data packets are relatively small and the number of users is large. The number of sub-channels included in the resource pool B is relatively small. The number of RBs included in each sub-channel in the resource pool B is relatively large. The resource pool B is applicable to a scenario in which user data packets are relatively large and the number of users is small.

Figure 12:
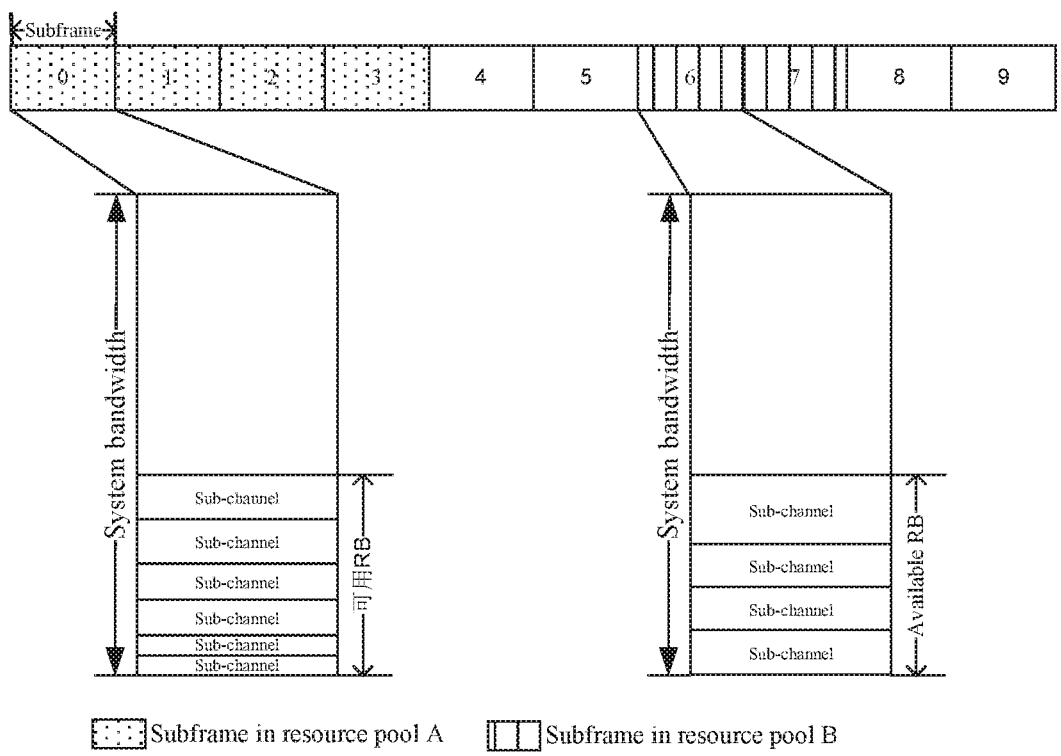
FIG. 12 is a second schematic diagram of the sub-channel configuration in an eighth example according to a preferred embodiment of the present disclosure.

For example, two resource pools are assigned on time domain with non-overlapped subframes in a system. According to service requirements, independent sub-channel configuration may be configured for the two resource pools and indicated respectively. FIG. 12 is a second schematic diagram of the sub-channel configuration in the example 8 according to a preferred embodiment of the present disclosure. The number of sub-channels included in the resource pool A is relatively large. The number of RBs included in each sub-channel in the resource pool A is relatively small. The resource pool A is applicable to a scenario in which user data packets are relatively small and the number of users is large. The number of sub-channels included in the resource pool B is relatively small. The number of RBs included in each sub-channel in the resource pool B is relatively large. The resource pool B is applicable to a scenario in which user data packets are relatively large and the number of users is small.

Method 8: The Sub-Channel is further Divided into a Control Information Resource Domain and a Data Information Resource Domain.

When the one or more sub-channels are used for carrying control information and data information or when the one or more sub-channels are used for carrying only the data information, the sub-channel is further divided into two parts: the control information resource domain and the data information resource domain. The control information resource domain is used for mapping and carrying the control information, and the data information resource domain is used for mapping and carrying the data information.

When the one or more sub-channels are divided into the control information resource domain and the data information resource domain, the total resources included in the two domains are all resources included in the sub-channel, that is, in the resources included in the sub-channel, resources excluding resources included in the control information resource domain are resources included in the data information resource domain.

In terms of information carrying, the control information resource domain is used for mapping and carrying only the control information. When the sub-channel carries only the data information, the data information is mapped onto and carried by resources included in the data information resource domain, and resources included in the control information resource domain cannot be used. That is, when the sub-channel does not carry the control information, resources included in the control information resource domain may not carry any information.

Among the resources included in the sub-channel, the control information resource domain and the data information resource domain are divided using one of the following manners.

On time-domain resources of the one or more sub-channels, the control information resource domain includes all available symbols in a subframe, and on frequency-domain resources of the sub-channel, the control information resource domain includes one or more fixed RBs.

On the time-domain resources of the one or more sub-channels, the control information resource domain includes one or more fixed symbols in the subframe, and on the frequency-domain resources of the one or more sub-channels, the control information resource domain includes all RBs.

On the time-domain resources of the one or more sub-channels, the control information resource domain includes the one or more fixed symbols in the subframe, and on the frequency-domain resources of the one or more sub-channels, the control information resource domain includes the one or more fixed RBs.

Example 9

A system predefines that, in resources of each sub-channel, RBs with the smallest two RB indexes among all RBs in the frequency domain included in the sub-channel and all available symbols on the time frequency serve as resources of the control information resource domain of the sub-channel, and the rest serve as resources of the data information resource domain of the sub-channel.

Figure 13:
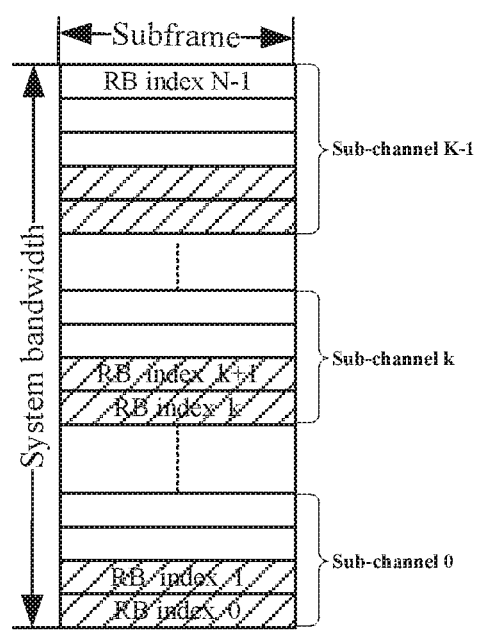
FIG. 13 is a schematic diagram of a control information resource domain in a sub-channel in a ninth example according to a preferred embodiment of the present disclosure.

As predefined by the system, the control information resource domain of each sub-channel includes low-order two RBs in the sub-channel, as shown in FIG. 13.

Example 10

Figure 14A:
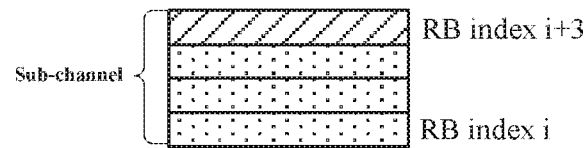
FIG. 14a is a schematic diagram illustrating that a sub-channel carries control information and data information in a tenth example according to a preferred embodiment of the present disclosure.
Figure 14B:
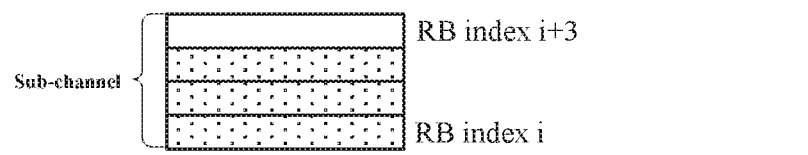
FIG. 14b is a schematic diagram illustrating that a sub-channel carries data information in the tenth example according to a preferred embodiment of the present disclosure.
Figure 14C:
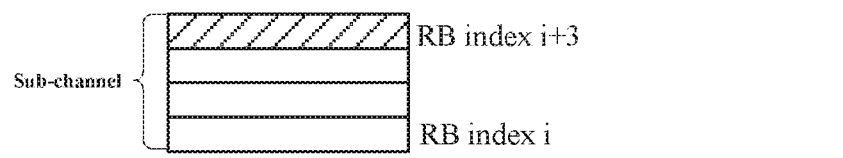
FIG. 14c is a schematic diagram illustrating that a sub-channel carries control information in the tenth example according to a preferred embodiment of the present disclosure.

A system configures, through high-layer signaling, an RB with the largest RB index in each sub-channel and all available symbols to serve as resources of the control information resource domain. According to system configuration, when a sub-channel carries control information and data information, the control information and the data information are mapped onto and carried by a control information resource domain and a data information resource domain respectively, as shown in FIG. 14a. When the sub-channel carries only the data information in the current subframe, the data information is mapped onto and carried by the data information resource domain, and resources in the control information resource domain are vacant and do not carry any information, as shown in FIG. 14b. Similarly, when the sub-channel carries only the control information in the current subframe, the control information is mapped onto and carried by the control information resource domain, and resources in the data information resource domain are vacant and do not carry any information, as shown in FIG. 14c.

From the description of the embodiments described above, it will be apparent to those skilled in the art that the method of any embodiment described above may be implemented by means of software plus a necessary general-purpose hardware platform, or may of course be implemented by hardware, but in many cases, the former is a preferred implementation mode. Based on this understanding, the solution provided by the present disclosure substantially, or the part contributing to the related art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

The various modules described above may be implemented by software or hardware. Implementation by hardware may, but not necessarily, be performed by the following method: the various modules described above are located in a same processor or the various modules described above are located in multiple processors respectively.

Embodiments of the present disclosure further provide a storage medium. Optionally, in this embodiment, the storage medium may be configured to store program codes for executing the steps described below.

In S1, frequency-domain resource blocks (RBs) in a system are divided into one or more sub-channels to form a sub-channel configuration of the system, where each of the RBs is included in only one of the one or more sub-channels.

In S2, each of the sub-channels is configured with a unique sub-channel index, and RBs included in a corresponding sub-channel that is used for carrying control information and/or data information of a user equipment is instructed by the sub-channel index.

Optionally, in this embodiment, the storage medium may include, but are not limited to, a U disk, a read-only memory (ROM), a random access memory (RAM), a mobile hard disk, a magnetic disk, an optical disk or another medium capable of storing program codes.

Optionally, in this embodiment, the processor executes the steps in the methods described in the above embodiments according to the program codes stored in the storage medium.

Optionally, for specific examples in this embodiment, reference may be made to the examples described in the above embodiments and optional implementations, and the specific examples will not be repeated in this embodiment.

Apparently, those skilled in the art should know that each of the above-mentioned modules or steps of the present disclosure may be implemented by a universal computing device, the above-mentioned modules or steps may be concentrated on a single computing device or distributed in a network formed by multiple computing devices, and alternatively, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

Embodiments of the present disclosure provide a resource configuration method and device. The method includes: assigning frequency-domain resource blocks (RBs) in a system to one or more sub-channels to form a sub-channel configuration in the system, where each of the RBs is included in only one sub-channel; and configuring each of the sub-channels with a unique sub-channel index, and instructing, through the sub-channel index, RBs included in a corresponding sub-channel be used for carrying control information and/or data information of a user equipment. The solution solves the problem of large overheads incurred by indicating configured time-domain/frequency-domain resources in a V2V communication system and reduces overheads incurred by indicating configured time-domain/frequency-domain resources.

What is claimed is:

1. A resource configuration method, comprising:
  assigning frequency-domain resource blocks (RBs) of a system into one or more sub-channels to form a sub-channel configuration of the system, wherein each of the RBs is included in only one sub-channel; and
  determining a unique sub-channel index for each sub-channel, and instructing one or more sub-channels, through the sub-channel index, to use the RBs included in the instructed one or more sub-channels to carry control information and/or data information of a user equipment;
  wherein when the one or more sub-channels are used for carrying the control information and the data information, the control information is carried in the following manner:
    on time-domain resources of the one or more sub-channels, the control information is mapped onto and carried by all symbols in a subframe, and on frequency-domain resources of the one or more sub-channels, the control information is mapped onto and carried by one or more consecutive fixed RBs in each of the one or more sub-channels;
  wherein the one or more symbols are Single-Carrier Frequency-Division Multiple Access (SC-FDMA) symbols or Orthogonal Frequency-Division Multiplexing (OFDM) symbols of the subframe.

2. The method of claim 1, wherein each sub-channel comprises one or more RBs in frequency domain and one subframe in time domain.

3. The method of claim 1, wherein the sub-channel configuration indicates consecutive physical RBs of the sub-channel assignment;
  or wherein the sub-channel configuration indicates consecutive logical RBs of the sub-channel assignment, wherein a mapping rule is built between the consecutive logical RBs and the physical RBs.

4. The method of claim 1, wherein when the one or more sub-channels are used for carrying the control information and the data information or when the one or more sub-channels are used for carrying the data information, the data information is carried in one of the following manners:
  on time-domain resources of the one or more sub-channels, the data information is mapped onto and carried by all available symbols in a subframe, and on frequency-domain resources of the one or more sub-channels, the data information is mapped onto and carried by one or more fixed RBs;
  on the time-domain resources of the one or more sub-channels, the data information is mapped onto and carried by one or more fixed symbols in the subframe, and on the frequency-domain resources of the one or more sub-channels, the data information is mapped onto and carried by all RBs included in the one or more sub-channels; and
  on the time-domain resources of the one or more sub-channels, the data information is mapped onto and carried by the one or more fixed symbols in the subframe, and on the frequency-domain resources of the one or more sub-channels, the data information is mapped onto and carried by the one or more fixed RBs.

5. The method of claim 1, wherein when the one or more sub-channels are used for carrying the control information and/or the data information of the user equipment, the one or more sub-channels comprise a control information resource domain and a data information resource domain, and wherein the control information resource domain of the one or more sub-channels is used for carrying the control information of the user equipment, and the data information resource domain of the one or more sub-channels is used for carrying the data information of the user equipment.

6. The method of claim 5, wherein when the resource configuration of the control information resource domain in the one or more sub-channels is predefined by the system, resources included in the control information resource domain within the one or more sub-channels are predefined by the system.

7. The method of claim 5, wherein resources included in the control information resource domain of the one or more sub-channels comprise one of the following manners:
- on time-domain resources of the one or more sub-channels, the control information resource domain comprises all available symbols in a subframe, and on frequency-domain resources of the one or more sub-channels, the control information resource domain comprises one or more fixed RBs;
- on the time-domain resources of the one or more sub-channels, the control information resource domain comprises one or more fixed symbols in the subframe, and on the frequency-domain resources of the one or more sub-channels, the control information resource domain comprises all RBs; and
- on the time-domain resources of the one or more sub-channels, the control information resource domain comprises the one or more fixed symbols in the subframe, and on the frequency-domain resources of the one or more sub-channels, the control information resource domain comprises the one or more fixed RBs.

8. The method of claim 5, wherein resources included in the data information resource domain in the one or more sub-channels comprise one of the following manners:
- on time-domain resources of the one or more sub-channels, the data information resource domain comprises all available symbols in a subframe, and on frequency-domain resources of the one or more sub-channels, the data information resource domain comprises one or more fixed RBs;
- on the time-domain resources of the one or more sub-channels, the data information resource domain comprises one or more fixed symbols in the subframe, and on the frequency-domain resources of the one or more sub-channels, the data information resource domain comprises all RBs; and
- on the time-domain resources of the one or more sub-channels, the data information resource domain comprises the one or more fixed symbols in the subframe, and on the frequency-domain resources of the one or more sub-channels, the data information resource domain comprises the one or more fixed RBs.

9. The method of claim 1, wherein the sub-channel configuration is indicated using at least one of the following manners: predefined by the system; indicated by a system broadcast message; and indicated by high-layer signaling,
- wherein when the sub-channel configuration is predefined by the system, a quantity of the RBs and positions of the RBs included in the each of the sub-channels are predefined by the system, sub-channel indexes of the sub-channels are sequentially defined, and the RBs included in a sub-channel corresponding to each of the sub-channel indexes are uniquely determined;
- wherein when the sub-channel configuration is indicated by the system broadcast message and/or the high-layer signaling, on available RBs in the system, a quantity of the RBs and positions of the RBs included in the each of the sub-channels are indicated by the system broadcast message and/or the high-layer signaling, the sub-channel indexes of the sub-channels are sequentially defined, and the RBs included in a sub-channel corresponding to each of the sub-channel indexes are uniquely determined;
- when the sub-channel configuration is indicated by the system broadcast message and/or the high-layer signaling, on available RBs in the system, each of the sub-channels is assigned to have a same quantity of RBs on available RBs in the system, the quantity of the RBs included in the one sub-channel is indicated, or a quantity of the sub-channels is indicated, the sub-channel indexes of the sub-channels are sequentially defined, and the RBs included in a sub-channel corresponding to each of the sub-channel indexes are uniquely determined.

10. A non-transitory computer-readable storage medium, storing computer-executable instructions for executing the resource configuration method of claim 1.

11. A resource configuration device, wherein the device comprises a processor and a memory for storing instructions executable by the processor, the processor is configured to:
- allocate frequency-domain resource blocks (RBs) of a system into one or more sub-channels to form a sub-channel configuration of the system, wherein each of the RBs is included in only one sub-channel; and
- determine a unique sub-channel index for each sub-channel, and instruct one or more sub-channels, through the sub-channel index, to use the RBs included in the instructed one or more sub-channels to carry control information and/or data information of a user equipment;
- wherein when the one or more sub-channels are used for carrying the control information and the data information, the control information is carried in the following manner:
  - on time-domain resources of the one or more sub-channels, the control information is mapped onto and carried by all symbols in a subframe, and on frequency-domain resources of the one or more sub-channels, the control information is mapped onto and carried by one or more consecutive fixed RBs in each of the one or more sub-channels;
- wherein the one or more symbols are Single-Carrier Frequency-Division Multiple Access (SC-FDMA) symbols or Orthogonal Frequency-Division Multiplexing (OFDM) symbols of the subframe.

12. The device of claim 11, wherein the each sub-channel comprises one or more RBs in frequency domain and one subframe in time domain.

13. The device of claim 11, wherein the sub-channel configuration indicates consecutive physical RBs of the of the sub-channels assignment;
- or wherein the sub-channel configuration indicates consecutive logical RBs of sub-channels assignment, wherein a mapping rule is built between the consecutive logical RBs and the physical RBs.

14. The device of claim 11, wherein when the one or more sub-channels are used for carrying the control information and the data information or when the one or more sub-channels are used for carrying the data information, the data information is carried in one of the following manners:
- on time-domain resources of the one or more sub-channels, the data information is mapped onto and carried by all available symbols in a subframe, and on frequency-domain resources of the one or more sub-channels, the data information is mapped onto and carried by one or more fixed RBs;
- on the time-domain resources of the one or more sub-channels, the data information is mapped onto and carried by one or more fixed symbols in the subframe, and on the frequency-domain resources of the one or more sub-channels, the data information is mapped onto and carried by all RBs included in the one or more sub-channels; and on the time-domain resources of the one or more sub-channels, the data information is mapped onto and carried by the one or more fixed symbols in the subframe, and on the frequency-domain resources of the one or more sub-channels, the data information is mapped onto and carried by the one or more fixed RBs.

15. The device of claim 11, wherein when the one or more sub-channels are used for carrying the control information and/or the data information of the user equipment, the one or more sub-channels comprise a control information resource domain and a data information resource domain, and wherein the control information resource domain of the one or more sub-channels is used for carrying the control information of the user equipment, and the data information resource domain of the one or more sub-channels is used for carrying the data information of the user equipment.

16. The device of claim 15, wherein when the resource configuration of the control information resource domain in the one or more sub-channels is predefined by the system, resources included in the control information resource domain within the one or more sub-channels are predefined by the system.

17. The device of claim 15, wherein resources included in the control information resource domain of the one or more sub-channels comprise one of the following manners:
on time-domain resources of the one or more sub-channels, the control information resource domain comprises all available symbols in a subframe, and on frequency-domain resources of the one or more sub-channels, the control information resource domain comprises one or more fixed RBs;
on the time-domain resources of the one or more sub-channels, the control information resource domain comprises one or more fixed symbols in the subframe, and on the frequency-domain resources of the one or more sub-channels, the control information resource domain comprises all RBs; and
on the time-domain resources of the one or more sub-channels, the control information resource domain comprises the one or more fixed symbols in the subframe, and on the frequency-domain resources of the one or more sub-channels, the control information resource domain comprises the one or more fixed RBs.

18. The device of claim 15, wherein resources included in the data information resource domain in the one or more sub-channels comprise one of the following manners:
on time-domain resources of the one or more sub-channels, the data information resource domain comprises all available symbols in a subframe, and on frequency-domain resources of the sub-channel, the data information resource domain comprises one or more fixed RBs;
on the time-domain resources of the one or more sub-channels, the data information resource domain comprises one or more fixed symbols in the subframe, and on the frequency-domain resources of the one or more sub-channels, the data information resource domain comprises all RBs; and
on the time-domain resources of the one or more sub-channels, the data information resource domain comprises the one or more fixed symbols in the subframe, and on the frequency-domain resources of the one or more sub-channels, the data information resource domain comprises the one or more fixed RBs.

19. The device of claim 15, wherein the sub-channel configuration is indicated using at least one of the following manners: predefined by the system; indicated by a system broadcast message; and indicated by high-layer signaling,
wherein when the sub-channel configuration is predefined by the system, a quantity of the RBs and positions of the RBs included in the each of the sub-channels are predefined by the system, sub-channel indexes of the sub-channels are sequentially defined, and the RBs included in a sub-channel corresponding to each of the sub-channel indexes are uniquely determined;
wherein when the sub-channel configuration is indicated by the system broadcast message and/or the high-layer signaling, on available RBs in the system, a quantity of the RBs and positions of the RBs included in the each of the sub-channels are indicated by the system broadcast message and/or the high-layer signaling, the sub-channel indexes of the sub-channels are sequentially defined, and the RBs included in a sub-channel corresponding to each of the sub-channel indexes are uniquely determined;
when the sub-channel configuration is indicated by the system broadcast message and/or the high-layer signaling, on available RBs in the system, each of the sub-channels is assigned to have a same quantity of RBs on available RBs in the system, the quantity of the RBs included in the one sub-channel is indicated, or a quantity of the sub-channels is indicated, the sub-channel indexes of the sub-channels are sequentially defined, and the RBs included in a sub-channel corresponding to each of the sub-channel indexes are uniquely determined.

* * * * *

UNITED STATES PATENT AND TRADEMARK OFFICE
CERTIFICATE OF CORRECTION

Page 1 of 1

PATENT NO. : 10,813,090 B2
APPLICATION NO. : 16/129633
DATED : October 20, 2020
INVENTOR(S) : Jin Yang It is certified that error appears in the above-identified patent and that said Letters Patent is hereby corrected as shown below:

In the Claims

In Column 32, Line 44, Claim 13, delete "of the of" and insert --of--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*